US012106595B2

(12) United States Patent
Agarwal et al.

(10) Patent No.: US 12,106,595 B2
(45) Date of Patent: *Oct. 1, 2024

(54) PSEUDO LABELLING FOR KEY-VALUE EXTRACTION FROM DOCUMENTS

(71) Applicant: Oracle International Corporation, Redwood Shores, CA (US)

(72) Inventors: Amit Agarwal, Kolkata (IN); Kulbhushan Pachauri, Bangalore (IN)

(73) Assignee: Oracle International Corporation, Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/379,091

(22) Filed: Oct. 11, 2023

(65) Prior Publication Data

US 2024/0037973 A1 Feb. 1, 2024

Related U.S. Application Data

(63) Continuation of application No. 17/714,806, filed on Apr. 6, 2022, now Pat. No. 11,823,478.

(51) Int. Cl.
*G06V 30/414* (2022.01)
*G06V 30/19* (2022.01)

(52) U.S. Cl.
CPC ...... *G06V 30/414* (2022.01); *G06V 30/19147* (2022.01); *G06V 30/19173* (2022.01); *G06V 30/19187* (2022.01)

(58) Field of Classification Search
CPC .......... G06V 30/40–43; G06V 30/191–19193
See application file for complete search history.

(56) References Cited

U.S. PATENT DOCUMENTS 5,912,989 A 6/1999 Watanabe
6,061,652 A 5/2000 Tsuboka et al.
(Continued)

FOREIGN PATENT DOCUMENTS

CN 107977345 A 5/2018
CN 113936340 A 1/2022
(Continued)

OTHER PUBLICATIONS

U.S. Appl. No. 17/524,157, "Notice of Allowance", mailed Feb. 28, 2024, 24 pages.
(Continued)

*Primary Examiner* — Sean T Motsinger
(74) *Attorney, Agent, or Firm* — Kilpatrick Townsend & Stockton LLP

(57) ABSTRACT

A computing device may access visually rich documents comprising an image and metadata. A graph, based on the image or metadata, can be generated for a visually rich document. The graph's nodes can correspond to words from the visually rich document. Features for nodes can be determined by the device. The device may generate model labeled graphs by assigning a pseudo-label to nodes using a pretrained model. The device may generate a plurality of graph labeled graphs by assigning a pseudo-label to nodes by matching a first node from a first graph to at least a second node from a second graph. The device may generate a plurality of updated graphs by cross referencing labels from the model labeled graphs and the graph labeled graphs. Until a change in labels is below a threshold, a model can be trained to perform key-value extraction using the updated graphs.

20 Claims, 15 Drawing Sheets

(56) References Cited

U.S. PATENT DOCUMENTS

| | | | |
|---|---|---|---|
| 9,424,668 B1* | 8/2016 | Petrou | G06T 11/206 |
| 11,003,959 B1 | 5/2021 | Levner et al. | |
| 11,087,081 B1 | 8/2021 | Srivastava et al. | |
| 11,341,367 B1 | 5/2022 | Barbosa et al. | |
| 11,430,467 B1 | 8/2022 | Vasudevan et al. | |
| 11,823,478 B2* | 11/2023 | Agarwal | G06V 30/19173 |
| 2002/0016798 A1 | 2/2002 | Sakai et al. | |
| 2012/0062574 A1* | 3/2012 | Dhoolia | G06V 30/422 |
| | | | 345/506 |
| 2016/0103833 A1 | 4/2016 | Sanders et al. | |
| 2017/0351965 A1 | 12/2017 | Kurniadi et al. | |
| 2019/0147853 A1 | 5/2019 | Gunasekara et al. | |
| 2020/0005118 A1 | 1/2020 | Chen et al. | |
| 2020/0104650 A1 | 4/2020 | Huang | |
| 2020/0125954 A1 | 4/2020 | Truong et al. | |
| 2020/0179808 A1 | 6/2020 | Lee et al. | |
| 2020/0285702 A1 | 9/2020 | Padhi et al. | |
| 2020/0320053 A1 | 10/2020 | He et al. | |
| 2020/0410231 A1* | 12/2020 | Chua | G06F 18/2413 |
| 2021/0089587 A1 | 3/2021 | Gupta et al. | |
| 2021/0133645 A1 | 5/2021 | Tazi et al. | |
| 2021/0158093 A1 | 5/2021 | Kaynig-Fittkau et al. | |
| 2021/0248323 A1* | 8/2021 | Maheshwari | G06V 30/416 |
| 2022/0092267 A1* | 3/2022 | Hou | G06F 40/279 |
| 2022/0171938 A1 | 6/2022 | Jalaluddin et al. | |
| 2022/0405682 A1 | 12/2022 | Yoon et al. | |
| 2023/0040084 A1 | 2/2023 | Cherukara et al. | |
| 2023/0146501 A1* | 5/2023 | Agarwal | G06N 3/09 |
| | | | 382/190 |
| 2023/0153335 A1* | 5/2023 | McNeill | G06F 16/316 |
| | | | 707/741 |
| 2023/0326224 A1 | 10/2023 | Agarwal et al. | |

FOREIGN PATENT DOCUMENTS

| | | |
|---|---|---|
| CN | 114491010 A | 5/2022 |
| WO | 2022078922 A1 | 4/2022 |

OTHER PUBLICATIONS

"Augmentation Pipeline for Rendering Synthetic Paper Printing, Faxing, Scanning and Copy Machine Processes", Available Online at: https://github.com/sparkfish/augraphy, Accessed from Internet on Apr. 4, 2022, pp. 1-13.

"BERT", Available Online at: https://huggingface.co/docs/transformers/model_doc/bert, Accessed from Internet on Mar. 2, 2022, 114 pages.

"DataGen- CeDar", Centre for Applied Data Analytics Research, Available Online at: https://old.ceadar.ie/wp-content/uploads/CeADAR_Flyer_DataGen_v2.pdf, 1 page.

"Datagen Synthetic Image Datasets for Computer Vision", Available Online at: https://datagen.tech/, Accessed from Internet on Jun. 1, 2022, pp. 1-6.

"Deterministic Algorithm", Wikipedia, Available Online at: https://en.wikipedia.org/wiki/Deterministic_algorithm, Accessed from Internet on Mar. 2, 2022, 4 pages.

"DistilBERT", Available Online at: https://huggingface.co/docs/transformers/model_doc/distilbert, Accessed from Internet on Mar. 2, 2022, 62 pages.

"LayoutLMFT", Available online at https://github.com/microsoft/unilm/tree/master/layoutlmft, Accessed from Internet on Aug. 19, 2021, 2 pages.

U.S. Appl. No. 17/714,806 entitled Pseudo Labelling for Key-Value Extraction from Documents, filed Apr. 6, 2022, pp. 1-69.

"Public Leader for SROIE", Available online at https://rrc.cvc.uab.es/?ch=13&com=evaluation&task=3, Accessed from Internet on: Aug. 19, 2021, 5 pages.

"Scipy.Optimize.Linear_Sum_Assignment", Available Online at: https://docs.scipy.org/doc/scipy-0.18.1/reference/generated/scipy.optimize.linear_sum_assignment.html, Sep. 19, 2016, 2 pages.

"Sklearn.Decomposition.PCA", Available Online at: https://scikit-learn.org/stable/modules/generated/sklearn.decomposition.PCA.html, Accessed from Internet on Mar. 2, 2022, 6 pages.

"Spaczz: Fuzzy Matching and More for Spacy", Available Online at: https://github.com/gandersen101/spaczz, Accessed from Internet on Mar. 2, 2022, 20 pages.

"Text Distance", Available Online at: https://github.com/life4/textdistance, Accessed from Internet on Mar. 2, 2022, 9 pages.

"Welcome to Albumentations Documentation", Available Online at: https://albumentations.ai/docs/, Accessed from Internet on Apr. 4, 2022, pp. 1-3.

"WordNet: A Lexical Database for English", Princeton University, Available Online at: https://wordnet.princeton.edu/, Accessed from Internet on Mar. 2, 2022, 4 pages.

U.S. Appl. No. 17/217,909, "Non-Final Office Action", mailed Apr. 18, 2023, 15 pages.

U.S. Appl. No. 17/217,909, "Notice of Allowance", mailed Jun. 8, 2023, 27 pages.

U.S. Appl. No. 17/714,806, "Notice of Allowance", mailed Jun. 22, 2023, 14 pages.

U.S. Appl. No. 17/714,806, "Notice of Allowance", mailed Jul. 26, 2023, 7 pages.

Abdelzad et al., "Detecting Out-of-Distribution Inputs in Deep Neural Networks Using an Early-Layer Output", Available Online at: https://arxiv.org/pdf/1910.10307.pdf, Oct. 23, 2019, 15 pages.

Ba, "Meta-data Driven Key-Value Pairs Extraction with Azure Form Recognizer", Available Online at: https://techcommunity.microsoft.com/t5/ai-cognitive-services-blog/meta-data-driven-key-value-pairs-extraction-with-azure-form/ba-p/1942595, Nov. 30, 2020, 8 pages.

Biswas et al., "DocSynth: A Layout Guided Approach for Controllable Document Image Synthesis", Available Online at: https://arxiv.org/pdf/2107.02638.pdf, Jul. 6, 2021, pp. 1-15.

Brems, "A One-Stop Shop for Principal Component Analysis", Towards Data Science, Available Online at: https://towardsdatascience.com/a-one-stop-shop-for-principal-component-analysis-5582fb7e0a9c, Apr. 18, 2017, 14 pages.

Chogovadze et al., "Controllable Data Augmentation Through Deep Relighting", Available Online at: https://arxiv.org/pdf/2110.13996.pdf, Oct. 26, 2021, pp. 1-15.

Delalandre et al., "Generation of Synthetic Documents for Performance Evaluation of Symbol Recognition & Spotting Systems.", International Journal on Document Analysis and Recognition, vol. 13, No. 3, Sep. 2010, pp. 187-207.

Devlin et al., "BERT: Pre-training of Deep Bidirectional Transformers for Language Understanding", Available Online at: https://arxiv.org/pdf/1810.04805.pdf, May 24, 2019, 16 pages.

Gautam, "Form Data Augmentation: Repository for Augmenting Data in Forms, Invoices and Receipts for Document Image Understanding", Available Online at: https://github.com/gautam-aayush/form-data-augmentation, Mar. 19, 2021, pp. 1-11.

Ghosh, "Invoice Information Extraction Using OCR and Deep Learning", Available Online at: https://medium.com/analytics-vidhya/invoice-information-extraction-using-ocr-and-deep-learning-b79464f54d69, Jan. 14, 2021, 31 pages.

Huang et al., "Out-of-Distribution Detection for LiDAR-based 3D Object Detection", Available Online at: https://arxiv.org/pdf/2209.14435v1.pdf, Sep. 28, 2022, 7 pages.

Jaadi, "A Step-by-Step Explanation of Principal Component Analysis (PCA)", Builtin.com, Available Online at: https://builtin.com/data-science/step-step-explanation-principal-component-analysis, Apr. 1, 2021, 8 pages.

Journet et al., "DocCreator: A New Software for Creating Synthetic Ground-Truthed Document Images", Journal of Imaging, vol. 3, Available Online at: https://hal.archives-ouvertes.fr/hal-01668915/file/jimaging.pdf, Dec. 2017, pp. 1-17.

Kim et al., "Joint Learning of Domain Classification and Out-of-Domain Detection with Dynamic Class Weighting for Satisficing False Acceptance Rates", Available online at: https://arxiv.org/pdf/1807.00072.pdf, Jun. 29, 2018, 6 pages.

Lane et al., "Out-of-Domain Utterance Detection Using Classification Confidences of Multiple Topics", Institute of Electrical and Electronics Engineers, Transactions on Audio, Speech, and Language Processing, vol. 15, No. 1, Jan. 1, 2007, pp. 150-161.

(56) References Cited

OTHER PUBLICATIONS

Lin et al., "An Efficient Data Augmentation Network for Out-of-Distribution Image Detection", IEEE Access, vol. 9, Feb. 24, 2021, pp. 35313-35323.

Liu et al., "Self-Supervised Learning: Generative or Contrastive", Available online at https://arxiv.org/pdf/2006.08218.pdf, Mar. 20, 2021, pp. 1-24.

Luan et al., "Out-Of-Distribution Detection for Deep Neural Networks with Isolation Forest and Local Outlier Factor", Available Online at: https://www.researchgate.net/publication/354189192_Out-Of-Distribution_Detection_for_Deep_Neural_Networks_with_Isolation_Forest_and_Local_Outlier_Factor, Aug. 27, 2021, 13 pages.

Ma, "NLP Augmentation", Available online at: https://github.com/makcedward/nlpaug, 2019, 4 pages.

Ma, "nlpaug: Data Augmentation for NLP", Available Online at: https://github.com/makcedward/nlpaug, Accessed from Internet on Apr. 4, 2022, 21 pages.

Moore et al., "Hungarian Maximum Matching Algorithm", Brilliant Math & Science Wiki, Available Online at: https://brilliant.org/wiki/hungarian-matching/, Accessed from Internet on Mar. 2, 2022, 7 pages.

Moore et al., "Matching (Graph Theory)", Brilliant Math & Science Wiki, Available Online at: https://brilliant.org/wiki/matching/, Accessed from Internet on Mar. 2, 2022, 6 pages.

Moore et al., "Matching Algorithms (Graph Theory)", Brilliant Math & Science Wiki, Available Online at: https://brilliant.org/wiki/matching-algorithms/, Accessed from Internet on Mar. 2, 2022, 5 pages.

International Application No. PCT/US2021/024917, "International Preliminary Report on Patentability", mailed Oct. 13, 2022, 9 pages.

International Application No. PCT/US2021/024917, "International Search Report and Written Opinion", mailed Jul. 12, 2021, 13 pages.

Rawat et al., "PnPOOD : Out-Of-Distribution Detection for Text Classification via Plug and Play Data Augmentation", Available Online at: https://arxiv.org/abs/2111.00506, Oct. 31, 2021, 9 pages.

Ronneberger et al., "U-Net: Convolutional Networks for Biomedical Image Segmentation", International Conference on Medical Image Computing and Computer-Assisted Intervention, Available Online at URL: https://arxiv.org/pdf/1505.04597.pdf, May 18, 2015, pp. 234-241.

Sebastianelli et al., "Automatic Dataset Builder for Machine Learning Applications to Satellite Imagery", Software X, vol. 15, Jul. 2021, 7 pages.

Sun et al., "Spatial Dual-Modality Graph Reasoning for Key Information Extraction", Journal of Latex Class Files, vol. 14, No. 8, Available online at https://arxiv.org/pdf/2103.14470.pdf, Aug. 2015, pp. 1-9.

Van Laer, "Recognition of Named Entities on Invoices for IxorDocs", Available Online at: https://medium.com/ixorthink/recognition-of-named-entities-on-invoices-for-ixordocs-9bef38d24429, Aug. 2, 2018, 14 pages.

Veyseh et al., "Improving Keyphrase Extraction with Data Augmentation and Information Filtering", Available Online at: https://www.researchgate.net/publication/363501653_Improving_Keyphrase_Extraction_with_Data_Augmentation_and_Information_Filtering, Sep. 11, 2022, 10 pages.

White , "By 2024, 60% of the Data Used for the Development of AI and Analytics Projects Will Be Synthetically Generated", Available Online at: https://blogs.gartner.com/andrew_white/2021/07/24/by-2024-60-of-the-data-used-for-the-development-of-ai-and-analytics-projects-will-be-synthetically-generated/, Jul. 24, 2021, pp. 1-4.

Xu et al., "LayoutLM: Pre-Training of Text and Layout for Document Image Understanding", Available Online at: https://arxiv.org/pdf/1912.13318.pdf, Aug. 23-27, 2020, 9 pages.

You et al., "Graph Contrastive Learning with Augmentations", 34th Conference on Neural Information Processing Systems, Available online at https://papers.nips.cc/paper/2020/file/3fe230348e9a12c13120749e3f9fa4cd-Paper.pdf, 2020, pp. 1-12.

Yu et al., "PICK: Processing Key Information Extraction from Documents using Improved Graph Learning-Convolutional Networks", arXiv:2004.07464, Available Online at: https://arxiv.org/pdf/2004.07464.pdf, Jul. 18, 2020, 8 pages.

International Application No. PCT/US2024/016876, "International Search Report and Written Opinion", mailed Jun. 5, 2024, 16 pages.

Tang et al., "MatchVIE: Exploiting Match Relevancy between Entities for Visual Information Extraction", Cornell University, Jun. 24, 2021, 7 pages.

Wei et al., "Robust Layout-aware IE for Visually Rich Documents with Pre-trained Language Models", Cornell University Library, May 22, 2020, 10 pages.

Xu et al., "Layout LMv2: Multi-Modal Pre-Training for Visually-Rich Document Understanding", Available Online at: https://arxiv.org/pdf/2012.14740v4, Jan. 10, 2022, 13 pages.

\* cited by examiner

600

PSEUDO LABELLING FOR KEY-VALUE EXTRACTION FROM DOCUMENTS

CROSS-REFERENCE TO RELATED APPLICATIONS

This application is a continuation of U.S. application Ser. No. 17/714,806, filed Apr. 6, 2022, entitled "PSEUDO LABELLING FOR KEY-VALUE EXTRACTION FROM DOCUMENTS," now allowed, which is related to U.S. Application No. 17/524,157, filed Nov. 11, 2021, entitled "TECHNIQUES FOR GRAPH DATA STRUCTURE AUGMENTATION," the disclosures of which are incorporated by reference herein in their entirety for all purposes.

BACKGROUND

Training a machine learning model to perform key-value extraction from physical documents can involve large amounts of labeled data. Supervised machine learning algorithms can require a considerable volume of labeled data with sufficient variations to learn patterns to generalize and extract key-value pairs from a new set of documents. Creating key-value labeled documents with high variation can involve human annotation which can be time consuming. Accordingly, improvements in generating key-value labeled documents are desirable.

BRIEF SUMMARY

In some aspects, two or more visually rich documents can be accessed by a computing device. The visually rich documents comprising an image and a plurality of metadata. For at least a subset of the accessed visually rich documents, a graph construction module of the computing device can generate a graph for the visually rich document. The graph can be based at least in part on the image or the metadata for least one visually rich document. The graph can comprise a plurality of nodes connected by a plurality of edges. A node can correspond to a word identified in a visually rich document. A plurality of features for at least one node in the graph can be determined by a feature extraction module of the computing device. A model pseudo-labeling module of the computing device can generate a plurality of model labeled graphs by assigning a model pseudo-label to at least a subset of the nodes using a pretrained model. A graph pseudo-labeling module of the computing device can generate a plurality of graph labeled graphs by assigning a graph pseudo-label to at least a subset of the nodes by matching a first node from a first graph to at least a second node from a second graph. A filtering module of the computing device can generate a plurality of updated graphs by updating the nodes based at least in part on cross referencing labels from the model labeled graphs and the graph labeled graphs. Until a change in labels is below a threshold, a training module of the computing device can train a machine learning model to perform key-value extraction using the plurality of updated graphs.

In some aspects, generating the plurality of updated graphs further comprises: identifying a model labeled graph and a graph labeled graph that correspond to the same visually rich document using a filtering module of the computing device. Inconsistent nodes can be identified by the filtering module and an inconsistent node can be a node where the model pseudo-label and the graph pseudo-label do not match. The filtering module of the computing device can update an inconsistent label for the inconsistent node based at least in part on a model confidence score for the model pseudo-label or a graph confidence score for the graph pseudo-label.

In some aspects, the metadata includes at least one of a plurality of words identified with optical character recognition (OCR), a set of user-thresholds, or a plurality of labels.

In some aspects, the two or more visually rich documents can include at least one labeled document.

In some aspects, the two or more visually rich documents include at least one of: drivers licenses, medical bills, gun licenses, passports, bank cards, employee identification (ID) card, college identification (ID) card, invoices, receipts, business cards, product catalogs, bank forms, investment forms, credit card statements, account statements, insurance forms, real estate forms, hospital forms, registration forms, proof of delivery documents, shipment bills, inquiry forms or checks.

In some aspects, the plurality of features includes at least one of: structural information, textual information, or visual information.

In some aspects, the plurality of graph labeled graphs are generated based at least in part on bipartite graph matching.

In some aspects, a non-transitory computer-readable medium storing a set of instructions includes instructions to: access two or more visually rich documents by a computing device. The visually rich documents comprising an image and a plurality of metadata. For at least a subset of the accessed visually rich documents, a graph construction module of the computing device can generate a graph for the visually rich document. The graph can be based at least in part on the image or the metadata for least one visually rich document. The graph can comprise a plurality of nodes connected by a plurality of edges. A node can correspond to a word identified in a visually rich document. A plurality of features for at least one node in the graph can be determined by a feature extraction module of the computing device. A model pseudo-labeling module of the computing device can generate a plurality of model labeled graphs by assigning a model pseudo-label to at least a subset of the nodes using a pretrained model. A graph pseudo-labeling module of the computing device can generate a plurality of graph labeled graphs by assigning a graph pseudo-label to at least a subset of the nodes by matching a first node from a first graph to at least a second node from a second graph. A filtering module of the computing device can generate a plurality of updated graphs by updating the nodes based at least in part on cross referencing labels from the model labeled graphs and the graph labeled graphs. Until a change in labels is below a threshold, a training module of the computing device can train a machine learning model to perform key-value extraction using the plurality of updated graphs.

In some aspects, a computing device includes: one or more memories; and one or more processors, communicatively coupled to the one or more memories, configured to cause the computing device to: access two or more visually rich documents by a computing device. The visually rich documents comprising an image and a plurality of metadata. For at least a subset of the accessed visually rich documents, a graph construction module of the computing device can generate a graph for the visually rich document. The graph can be based at least in part on the image or the metadata for least one visually rich document. The graph can comprise a plurality of nodes connected by a plurality of edges. A node can correspond to a word identified in a visually rich document. A plurality of features for at least one node in the graph can be determined by a feature extraction module of the computing device. A model pseudo-labeling module of the computing device can generate a plurality of model labeled graphs by assigning a model pseudo-label to at least a subset of the nodes using a pretrained model. A graph pseudo-labeling module of the computing device can generate a plurality of graph labeled graphs by assigning a graph pseudo-label to at least a subset of the nodes by matching a first node from a first graph to at least a second node from a second graph. A filtering module of the computing device can generate a plurality of updated graphs by updating the nodes based at least in part on cross referencing labels from the model labeled graphs and the graph labeled graphs. Until a change in labels is below a threshold, a training module of the computing device can train a machine learning model to perform key-value extraction using the plurality of updated graphs.

DETAILED DESCRIPTION

Figure 1:
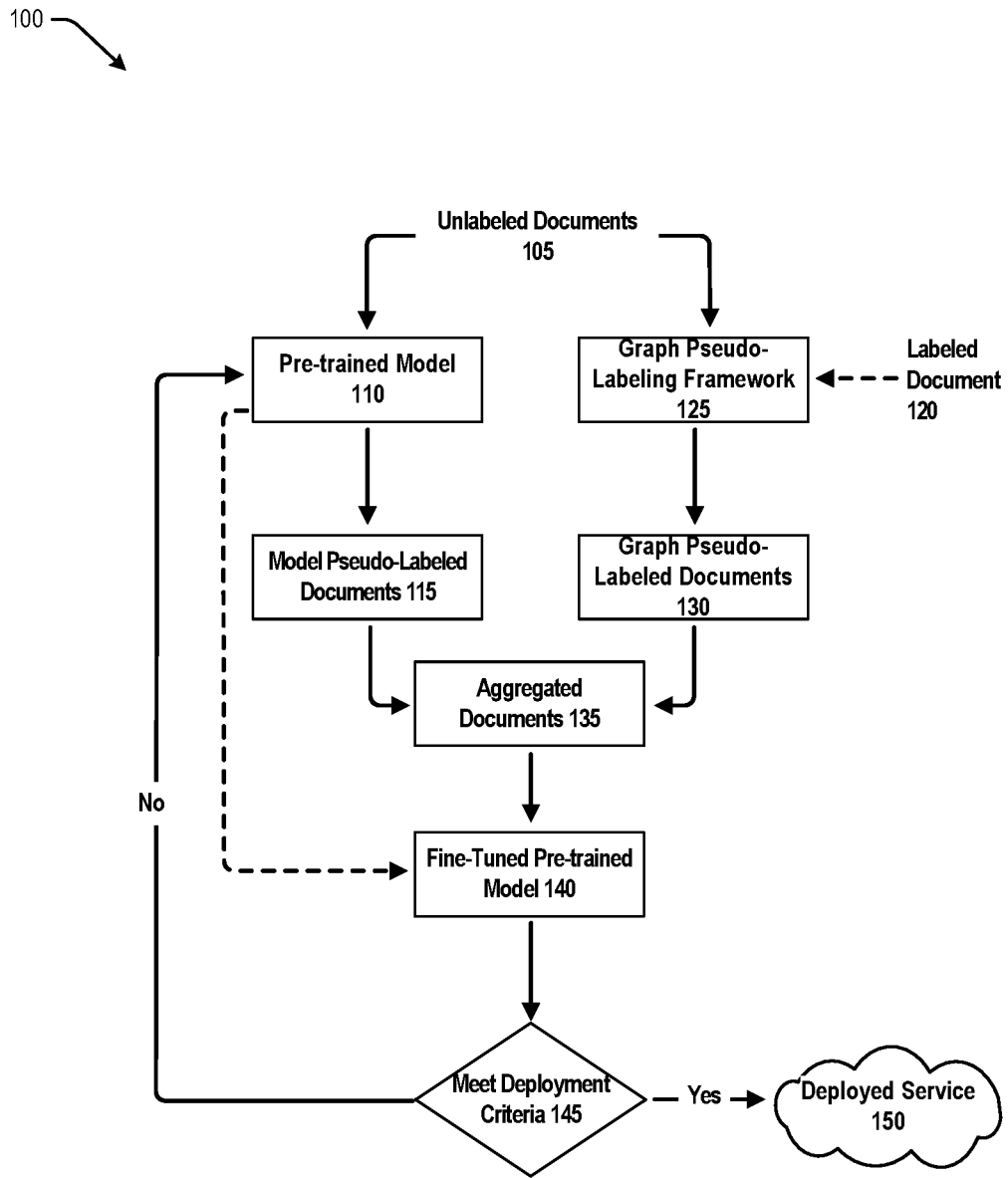
FIG. 1 is a simplified diagram of a high level process for deploying a key-value extraction model according to an embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure provide techniques for pseudo-labeling key-value pairs in visually rich documents (VRDs). VRDs can be documents that convey information beyond the document's text and a VRD can convey data though structural information, textual information, and visual information. For instance, a VRD may convey that a field "Jones" is a last name because of the proximity of "Jones" to a "Name" field. VRDs can include driving licenses, passports, identification cards, checks, receipts, invoices, medical forms, insurance forms, tax forms, account statements, insurance forms, etc.

Information in a VRD can be arranged as key-value pairs (e.g., name-value pairs, attribute-value pairs, field-value pairs, semantic classes, etc.). The pairs can comprise a key, that defines a dataset, and one or more pairs, that belongs to the data set. For example, a key can be "country" that defines a dataset as including a list of countries. Values associated with the key can include one or more countries such as "Mexico," "Ukraine," etc.

A value may have to be linked to a pair to convey information because an isolated value may not have enough context to provide meaningful information. For instance, it can be difficult to know what the value "Ukraine" means without a corresponding key. "Ukraine" could refer to a country but "Ukraine" could also refer to a business, a person, etc. For instance a business could be named "Ukraine Imports."

Structural information can be conveyed by a document's specific layout including the relative arrangement of words, images, graphs, or other elements in a document. Structural information can include the relative positioning or the relative sizing of elements or fields in a document. Structural information can be determined using a pre-trained model such as Processing Key Information Extraction from Documents using Improved Graph Learning-Convolutional Networks (PICK) (e.g., Yu, Wenwen, et al. "PICK: processing key information extraction from documents using improved graph learning-convolutional networks." 2020 25th International Conference on Pattern Recognition (ICPR). IEEE, 2021), Spatial Dual-Modality Graph Reasoning for Key Information Extraction (SDMG-R) (e.g., Sun, Hongbin, et al. "Spatial Dual-Modality Graph Reasoning for Key Information Extraction." arXiv preprint arXiv:2103.14470 (2021)), etc.

Textual information can include characters extracted from VRDs through optical character recognition. The characters can be converted to text features using text embeddings created by language models including deep learning-based language models. The characters can be converted into one-hot encoded vectors or sparse matrices that can be used for syntactic matching or text matching.

Visual information can include the styling of the font design, color, background, or images in a VRD. Styling can convey information in a VRD and, for instance, important words may be bold or a distinctive color compared to the background. Keys may have uniform styling across documents while values may have variable styling between documents. For instance, in a medical record, the keys may be printed in a uniform font while values may be hand written. Visual information can be determined with a trained model including convolution deep learning models such as U-Net (Ronneberger, Olaf & Fischer, Philipp & Brox, Thomas. (2015). U-Net: Convolutional Networks for Biomedical Image Segmentation. LNCS. 9351. 234-241. 10.1007/978-3-319-24574-4_28).

Key-value extraction from VRDs can be performed by a machine learning model. Unsupervised machine learning models, that do not require labeled data for training, are not as effective at key-value extraction as supervised machine learning models trained on labeled data. Obtaining labeled data to train a model to perform key-value extraction on VRDs can be challenging. Human labeled VRDs can be expensive and time consuming to produce. Training a machine learning model may require millions of labeled documents, and each word in the documents may need to be assigned a label. Labeling a single VRD can take hours and the cost and time required to obtain training data can be significant. The difficulty in obtaining labeled VRDs can be exacerbated by the diversity of formats across VRDs. While receipts, for example, share some common features, each organization producing a receipt may have a different receipt layout or template. Labeled VRDs from a variety of templates or layouts may be needed to produce a trained model that is not overfit to VRDs from one source.

Labeled training data can be obtained using a labeling model that applies pseudo-labels to VRDs. The labeling model can use graph theory to generate a training data set of labeled VRDs from a single labeled document. A labeled VRD and a number of unlabeled VRDs with layouts that are similar to the labeled document can be provided to the labeling model. Pseudo labels, labels provided by a labeling model rather than a person, can be generated for key-value pairs in the unlabeled VRDs. The labeling model can use the labeled VRD to assign pseudo-labels to the unlabeled VRDs.

When the labeling model is provided with a labeled VRD, the labeling model can label documents with approximately 97% accuracy. The labeling model can also label documents in an unsupervised fashion without a labeled VRD. Results from the unsupervised labeling model can be less accurate than the annotations from a supervised labeling model, but the unsupervised labeling model can provide generic key-value pairs based on landmarks and dynamic fields in the VRDS.

Landmarks can be fields that remain the same across two VRDs while dynamic fields can be fields that change between VRDs. For example, an identification (ID) card can have a static field "DOB" that is found in every ID, and a dynamic field "01/01/2000" that changes between IDs. The unsupervised model can cross reference fields from VRDs to identify static fields and dynamic fields. Static fields may be assumed to be keys while dynamic fields may be assumed to be values.

In an illustrative example, an insurance company may want to train a model to perform key-value extraction on medical records. The insurance company supplies a set of unlabeled VRDs with the same layout to a model training service. The model training service can use the supplied VRDs to prepare a model to perform key-value extraction. The insurance company decides to provide unlabeled VRDs to see if an unsupervised labeling model is sufficient for the company's needs.

After receiving the unsupervised labeling model, the insurance company decides that a higher precision model is needed. An insurance company employee labels one of the VRDs supplied to the model training service and the service uses the labeled VRD, along with the unlabeled VRDs, to prepare pseudo-labeled VRDs. The model training service calculates a weighted cost-matrix based on various extracted features between each word in the labeled document and each word in the unlabeled document. For instance, words may be correlated because they are the same size, have the same font, conveying same contextual meaning and/or are in the same location in both documents. The costs are added to a cost matrix and the graph matching algorithm can use the matrix to assign pseudo-labels to words in the unlabeled VRDs. Once the words in the unlabeled VRDs have been assigned pseudo-labels, the pseudo-labeled VRDs, and the labeled VRD, can be used to train a model to perform key-value extraction.

FIG. 1 is a simplified diagram 100 of a high level process for preparing and deploying a key-value extraction model according to an embodiment. The process can be used to generate a trained model that can perform key-value extraction on visually rich documents (VRDs). The process can take a pre-trained model and iteratively fine-tune the model until a deployment criteria is met.

Turning to diagram 100 in greater detail, preparing a key-value extraction model can begin by accessing unlabeled documents 105. The unlabeled documents can be VRDs including medical records, receipts, invoices, identification (ID) cards, etc. The unlabeled documents can be provided from a client requesting the key-value extraction model. The customer may provide unlabeled documents that are similar to the type of VRDs that the customer wants the final trained model to assign labels to.

Unlabeled documents 105 can be provided to a pre-trained model 110 that is trained to perform key-value extraction. Pre-trained model 110 can be trained on a variety of VRD types, and the model can identify key-value pairs in different VRD types (e.g., ID cards, receipts, medical documents, etc.). Labels (e.g., semantic classes, key, value, etc.) that are assigned by pre-trained model 110 can be called pseudo-labels, and VRDs that are labeled by pre-trained model 110 can be model pseudo-labeled documents 115 (e.g., model pseudo-labeled graphs (Gm), etc.).

Unlabeled documents 105 and a labeled document 120 can be added to graph pseudo-labeling framework 125. Labeled document 120 can be a VRD and labeled document 120 can be one or more labeled documents. Graph pseudo-labeling framework 125 can include a pre-trained model (e.g., pre-trained model 110, etc.). The pre-trained model, as part of graph pseudo-labeling framework 125, can assign pseudo-labels to unlabeled documents 105. The pseudo-labels assigned to unlabeled documents 105 can be based at least in part on the key-value labels (e.g., semantic classes, etc.) from labeled document 120.

Pseudo-labels can be assigned to unlabeled documents by creating a graph consisting of nodes linked by edges. A node can correspond to a word in the document and a pseudo-label can be assigned to a node. Similarly, model pseudo-labeled documents 115 can also be labeled by creating graphs. Documents labeled by graph pseudo-labeling framework 125 can be graph pseudo-labeled documents 130. A confidence score can be generated for nodes in the graph pseudo-labeled documents 130. The confidence score can reflect a level of confidence that the pseudo-label for the node is accurate, and the confidence score can be generated by at least one of pre-trained model 110 or graph pseudo-labeling framework 125.

The training data can be processed to create aggregated documents 135. Model pseudo-labeled documents 115 and graph pseudo-labeled documents 130 can be cross referenced. The labels for a node in a model pseudo-labeled graph (Gm; e.g., model pseudo-labeled documents 115, etc.) and a graph pseudo-labeled graph (Gg; e.g., graph pseudo-labeled documents 130, etc.) can be compared. If the pseudo-labels for the node are the same, or the confidence score for the graph labeled document node is below a threshold, the pseudo-labels can remain unchanged. If the pseudo-labels for the node are different, and the confidence score for the node in the graph pseudo-labeled graph is above a threshold, the pseudo-label for the node in the model labeled document can be changed to the pseudo-label from the graph pseudo-labeled document.

Pre-trained model 110 can be fine-tuned, or retrained on a new dataset, using aggregated documents 135 to produce a fine-tuned pre-trained model 140. Data augmentation techniques (e.g., U.S. Non-Provisional Application No. 17,524,157, filed Nov. 11, 2021, entitled "Techniques for Graph Data Structure Augmentation," etc.) can be used to supplement aggregated documents 135 as part of the fine-tuning process. The fine-tuned pre-trained model 140 can be used as pre-trained model 110 to relabel unlabeled documents 105 to produce model pseudo-labeled documents 115. Model pseudo-labeled documents 115 produced with fine-tuned pre-trained model 140 can be used to produce aggregated documents 135 and the fine-tuned model can be further fine-tuned to produce another fine-tuned pre-trained model 140.

When a new fine-tuned pre-trained model 140 is produced, the model can be checked against deployment criteria at decision block 145. The cycle of using fine-tuned pre-trained model to relabel unlabeled documents 105 to produce a new fine-tuned pre-trained model 140 can continue until fine-tuned pre-trained model 140 satisfies the deployment criteria. A model can meet the deployment criteria if the percent change between cycles of the labels in model pseudo-labeled documents 115 is below a threshold. Upon satisfying the deployment criteria, the model can be released as a deployed service 150.

Figure 2:
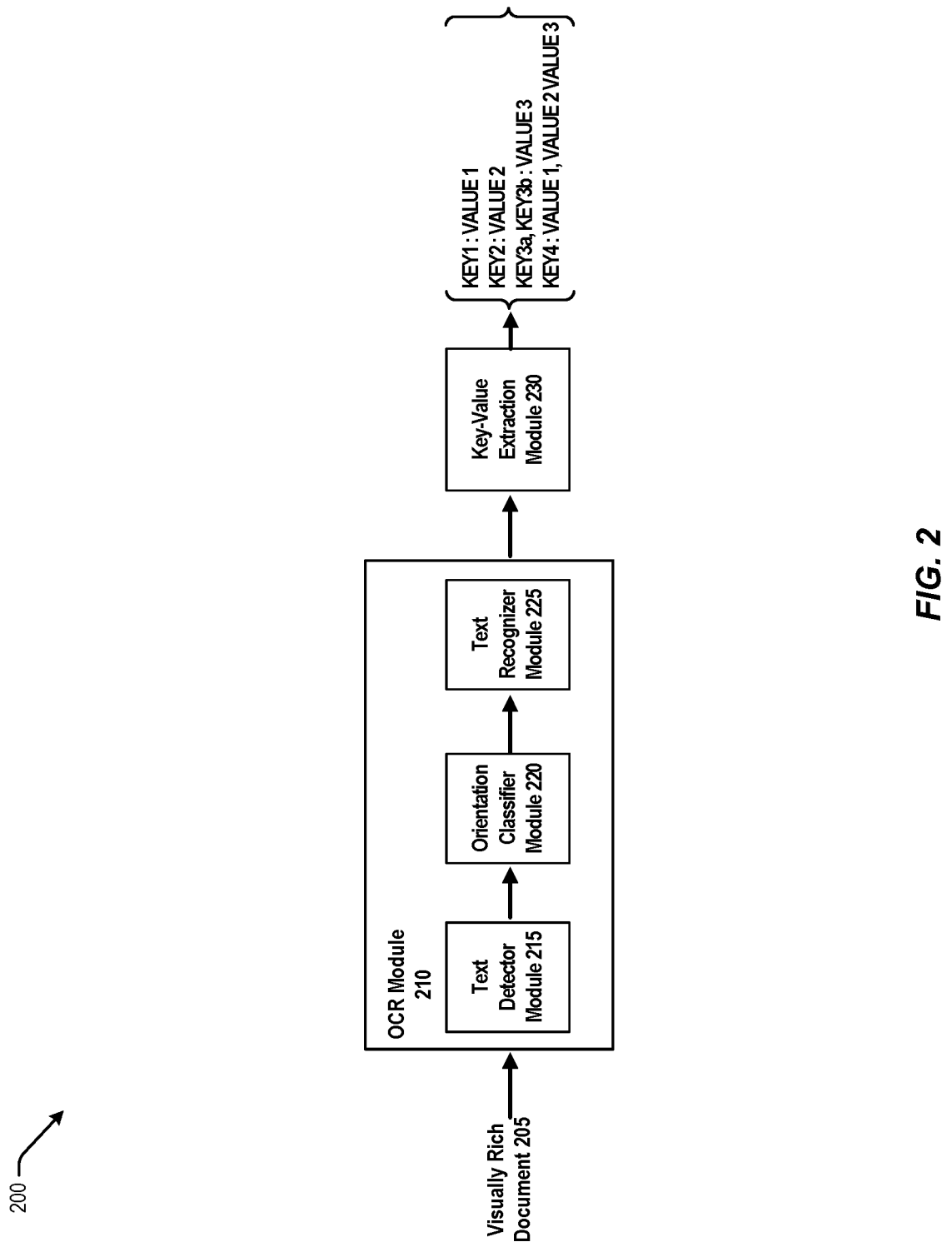
FIG. 2 shows a high level diagram of key-value extraction from visually rich documents (VRDs) according to an embodiment.

FIG. 2 shows a high level diagram 200 of key-value extraction from visually rich documents (VRDs) according to an embodiment. Key-value extraction can be the process of identifying, and linking, a constant that defines a dataset, called a key, with a variable belonging to the dataset (e.g., a value, etc.).

Key-value extraction from VRDs can include extracting text from the documents. Text extraction can be the process of converting typed or handwritten text into a machine-readable format, and text detection can be performed through optical character recognition (OCR). VRD 205 can be provided to an OCR module 210 that can comprise at least one of: a text detector module 215, an orientation classifier module 220, or a text recognizer module 225.

Text detector module 215 can detect areas in VRD 205 that contain text. OCR can be computationally demanding and using text detector module 215 can reduce the search space by segmenting VRD 205 into areas with text, where text recognition can be performed, and areas without text that may be excluded from text detection.

Orientation classifier module 220 can detect the orientation of words in VRD 205. Information can be conveyed by the orientation of a word and, for example, "smug" can be "gums" depending on the word's orientation. The text in a word can be detected by text recognizer module 225. Text can be recognized using a variety of techniques including feature extraction, matrix matching, etc.

Text recognized from VRD 205 can be provided from OCR module 210 to a key-value extraction module 230 that can perform key-value extraction. In addition to the document's text (e.g., textual information), the structural information and visual information of VRD 205 can convey information. Key-value extraction module 230 can identify key-value pairs based at least in part on the textual information including text identified by OCR module 210, visual information including the color of recognized text, the relative size of recognized text, the font of recognized text, etc., and structural information including the layout of recognized text, etc.

Keys or values may be identified by key-value extraction module 230 by matching labeled keys or values from a labeled VRD to text in an unlabeled VRD. For example, key-value extraction module 230 may identify text from an unlabeled VRD as a key because the text is located in the same location, contains the same characters, and is the same size as a key from a labeled VRD. Key-value extraction module 230 can perform key-value extraction using a trained machine learning model.

Key-value extraction module 230 can identify keys in several unlabeled VRDs by cross referencing text across the VRDs. Text with characters and visual characteristics that do not change significantly across different VRDs (e.g., static fields) may be keys. Text with characters and visual characteristics that change between VRDs (e.g., dynamic fields) may be values.

Figure 3:
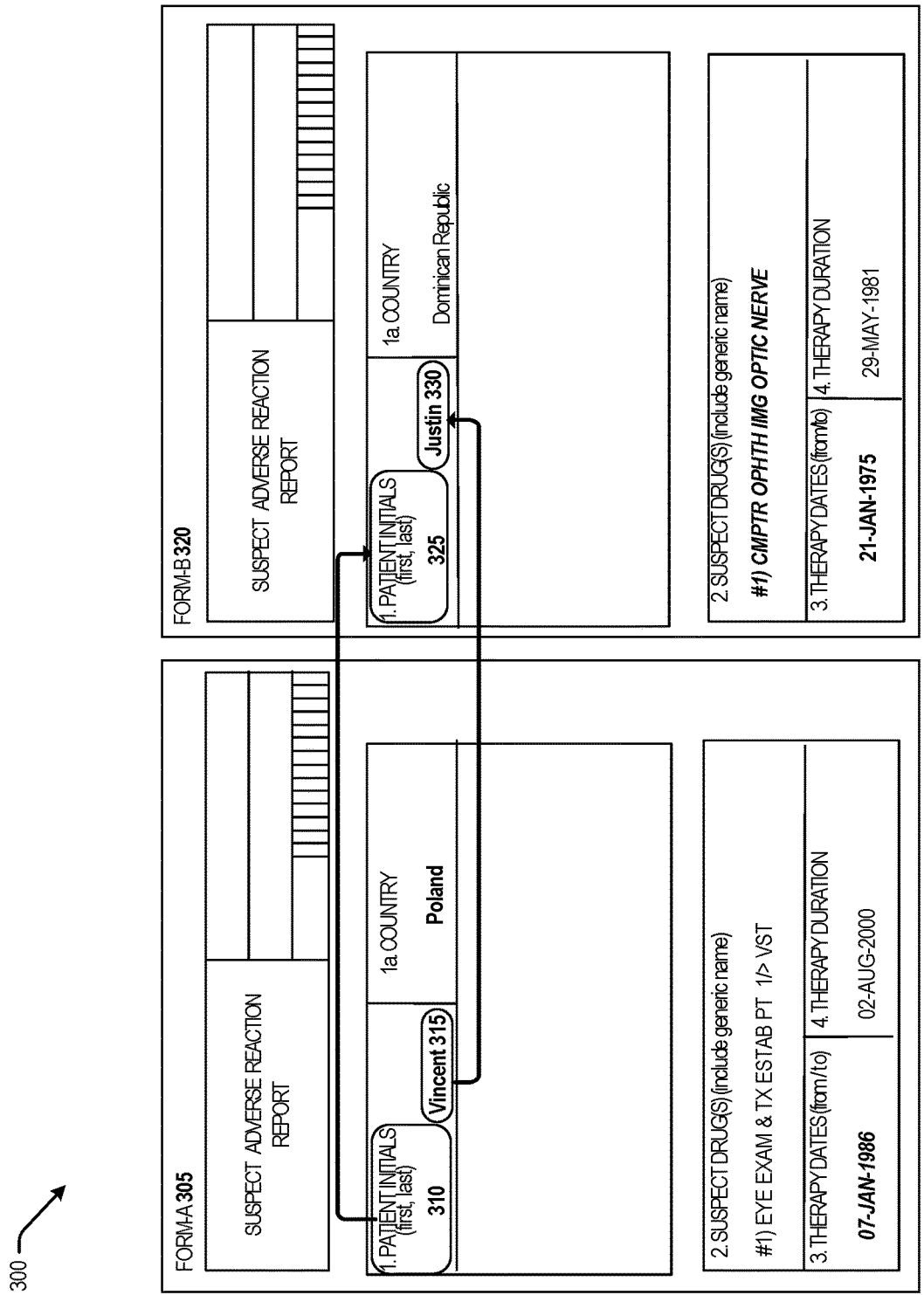
FIG. 3 is a diagram showing key-value extraction in an unlabeled visually rich document (VRD) using a labeled VRD according to an embodiment.

FIG. 3 is a diagram 300 showing key-value extraction in an unlabeled visually rich document (VRD) using a labeled VRD according to an embodiment. In this case, the VRDs are medical records but other VRDs are possible including identification (ID) cards, drivers licenses, passports, receipts, advertisements, checks, etc.

Form-A 305 is a medical record and the form can be a labeled VRD. A person can label form-A using specialized software by selecting text in the VRD and assigning a label to the selected text. For instance, the person can select "1. PATIENT INITIALS (first, last)" 310 and the person can assign the label "name-key." The person can select the text "Vincent" 315 and assign the key "name-value." Each key or value can comprise one or more words.

Form-B 320 can be a medical record with the same layout as Form-A 305, and the form can be an unlabeled VRD. An optical character recognition module (e.g., OCR module 210, etc.) can extract text from form-B 320. A key-value extraction module (e.g., key-value extraction module 230, etc.) can use a trained model to identify keys or values in form-B 320. For instance, "1. PATIENT INITIALS (first, last)" 325 can be labeled as "name-key" by the key-value extraction module based at least in part on similarities in the characters, structural information, and visual information of "1. PATIENT INITIALS (first, last)" 310 and "1. PATIENT INITIALS (first, last)" 325.

A key-value extraction module can identify a value field in form-B 320 based at least in part on identified characters, structural information, and visual information from the VRD. For instance, "Justin" 330 may be identified as a "name-value" based on similarities between the unlabeled field "Justin" 330 and the labeled field "Vincent" 315. "Justin" 330 may be labeled based at least in part on the field's location in form-B 320 which is similar to the location of "Vincent" 315 in form-A 305. Assigning the label "name-value" to "Justin" 330 may be based at least in part on the field's proximity to the "key-value" field "1. PATIENT INITIALS (first, last)" 325.

A key-value extraction module can assign key or value labels to VRDs without reference to a labeled VRD. To identify keys and values, a trained model in a key-value extraction module can compare fields from form-A 305 and form-b 320. For instance, "1. PATIENT INITIALS (first, last)" 310 and "1. PATIENT INITIALS (first, last)" 325 may be identified as keys because the location, font, characters for each field do not vary significantly between documents (e.g., static field). The fields "Vincent" 315 and "Justin" 330 can be labeled as "name-value" because the fields have changing structural information, textual information, or visual information (e.g., dynamic field) and the fields are located in proximity to a key field.

Figure 4:
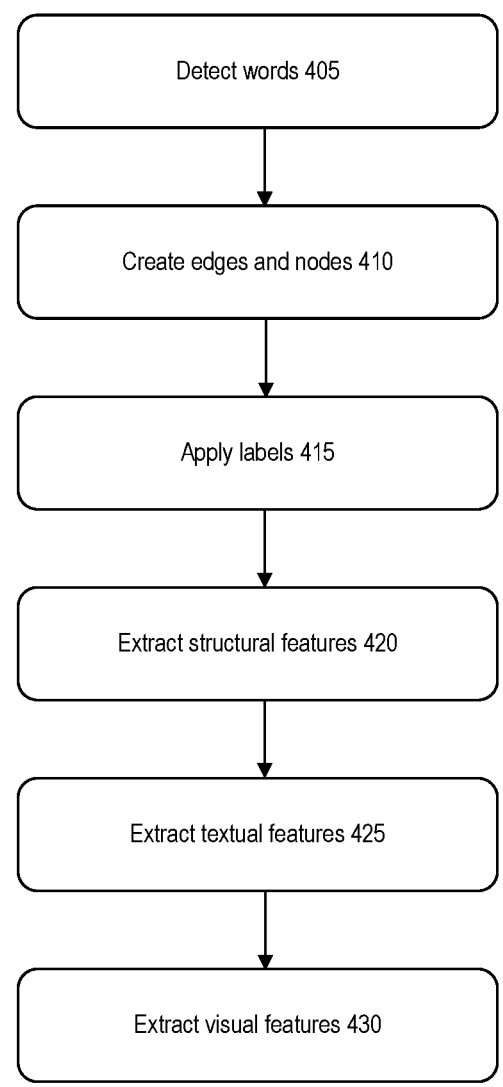
FIG. 4 is diagram of a process for creating a matching graph from visually rich documents (VRDs) according to an embodiment.
Figure 6:
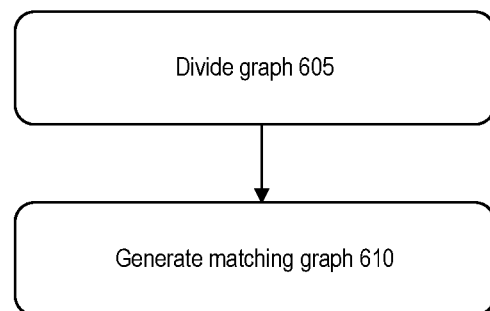
FIG. 6 is a diagram showing a process for bipartite matching according to an embodiment.
Figure 8:
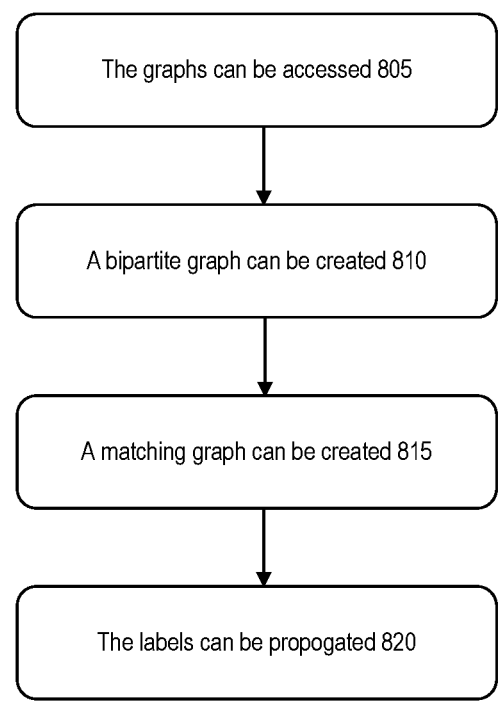
FIG. 8 shows a process for using bipartite matching to assign labels to a visually rich document (VRD) according to an embodiment.

FIG. 4 is diagram of a process 400 for creating a graph from a visually rich document (VRD) according to an embodiment. This process, along with the process disclosed in relation to FIGS. 6 and 8, is illustrated as a logical flow diagram, each operation of which can be implemented in hardware, computer instructions, or a combination thereof. In the context of computer instructions, the operations may represent computer-executable instructions stored on one or more computer-readable storage media that, when executed by one or more processors, perform the recited operations. Generally, computer-executable instructions include routines, programs, objects, components, data structures and the like that perform particular functions or implement particular data types. The orders in which the operations are described are not intended to be construed as a limitation, and any number of the described operations can be combined in any order and/or in parallel to implement the processes or the method.

Turning to process 400 in greater detail, at block 405, words are detected from a VRD. The words in the VRD can be detected with an optical character recognition (OCR) engine (e.g., OCR module 210). The OCR engine may create a bounding box around an identified word. The VRD can be a document that conveys information through structural information, textual information, or visual information (e.g., form-A 305, form-B 320, etc.).

At block 410, nodes and edges are created. A node (e.g., node 520*a-b* from FIG. 5A and FIG. 5B, etc.) can be created for every word in the VRD. The nodes can be connected with edges, and the edges can be initialized with the distance between the two nodes connected by the edge. The edge can have a weight that is inversely related to the distance between nodes, where the weight in an edge connecting nearby nodes is higher than the weight connecting distant nodes. The distance can be the Euclidian distance, Manhattan distance, or Chebyshev distance, etc. between the centroids of the text bounding boxes received from the OCR output. Every node can be connected to every other node by an edge.

At block 415, labels can be applied. If the VRD is labeled with key-value pairs (e.g., semantic classes, etc.), the labels can be applied to the graph. Labels can be added to nodes that are created from labeled words, and the node's label can be the same as the word's label.

At block 420, structural features are extracted. The structural features can be structural information about the layout of a VRD including the relative arrangement of words, images, graphs, etc. Features can be extracted and stored in layout embeddings using pre-trained models like Processing Key Information Extraction from Documents using Improved Graph Learning-Convolutional Networks (PICK), Spatial Dual-Modality Graph Reasoning for Key Information Extraction (SDMG-R), etc. The structural information can also include the relative positioning of nodes, or the relative font size of different words.

At block 425, textual features are extracted. The text embeddings can be created for the extracted textual features, and the extracted features can include textual information. The text embedding for a node can be a high dimensional vector that stores the contextual meaning, similarity, and distance between the node and other nodes in the graph. Textual information can also be stored as one-hot encoded vectors or sparse matrices that can be used for syntactic or text matching.

At block 430, visual features are extracted. The visual features can include visual information, and the features can be extracted using convolution deep learning model such as U-Net. The extracted feature, including the structural features, textual features, or visual features can be fused or stored independently. The features can be fused via concatenating, weighted summation, weighted averaging, Kronecker product approximated by the block-diagonal tensor decomposition, t-distributed stochastic neighbor embedding (TSNE), principal component analysis (PCA), etc.

Figure 5B:
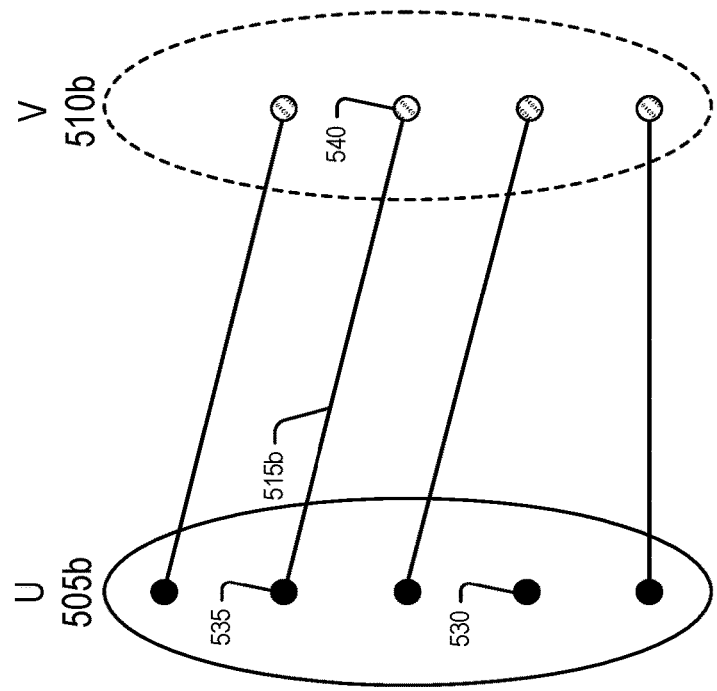
FIG. 5B is a diagram showing a matching graph for a bipartite graph according to an embodiment.
Figure 5A:
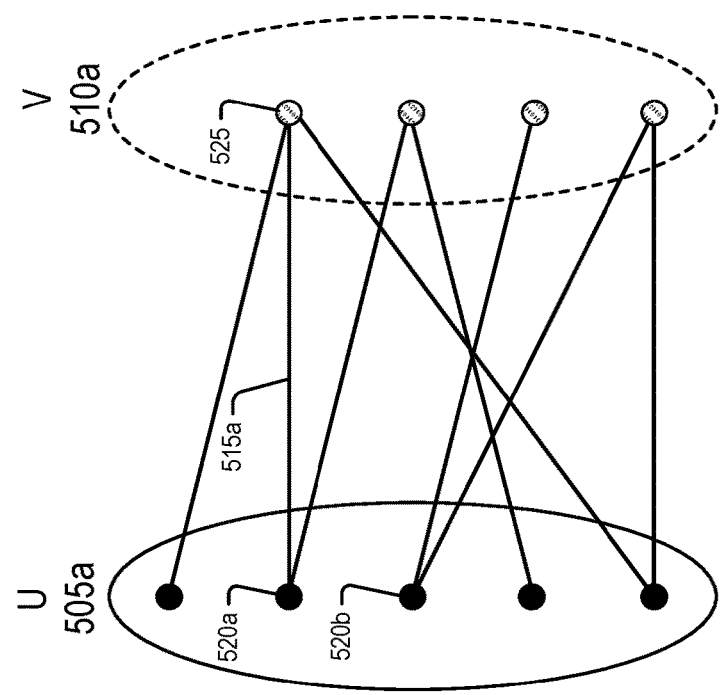
FIG. 5A shows a diagram of a bipartite graph according to an embodiment.

FIG. 5A shows a diagram of a bipartite graph 500 according to an embodiment. A graph can comprise edges (e.g., nodes, vertices, etc.) connected by edges (e.g., link, line, etc.). Graph matching can be a process of finding similarities between graphs. A bipartite graph is a graph that can be separated into two independent groups, U 505*a* and V 510*a*, so that each edge 515*a* connects between nodes in U 505*a* and nodes in V 510*a* (e.g., node 520*a-b*, 525, etc.).

FIG. 5B is a diagram showing a matching graph 501 for a bipartite graph according to an embodiment. A matching graph can be nodes connected by a set of edges (e.g., 515*b*) that do not have share a common node (e.g., 535, 540, etc.). One or more matching graphs can be created from a bipartite graph (e.g., U 505*b* and V 510*b*). A matching graph can be generated by a graph matching algorithm that finds a one-to-one mapping between two sets of nodes. An unconnected node 530 can be a node in a matching graph 501 that is not connected by an edge.

FIG. 6 is a diagram showing a process 600 for bipartite matching according to an embodiment. Bipartite matching can be used to create a matching graph, and bipartite matching can be performed by a matching module (e.g., 1075 from FIG. 10, etc.). A matching graph can be a graph where each node has either zero or one edge. The graph matching module (e.g., matching module 1075, etc.) can create the matching graph using different matching requirements including maximum matching, minimum weight matchings, perfect matching, etc.

Turning to process 600 in greater detail, at block 605, a graph is divided into a bipartite graph with two independent groups (e.g., U 505*a*, V 510*a*, etc.). An independent group can contain nodes (e.g., 520*a-b*) that are not connected by an edge such as 515*a*. Each edge such as 515*a* can connect a node 520*a* in one independent group U 505*a* to a node 525 in the other independent group 510*a*.

At block 610, a matching graph can be generated. A graph matching algorithm in the graph matching module (e.g., matching module 1075, etc.) can find a one-to-one mapping between the two independent groups (e.g., U 505*a-b*, V 510*a-b*, etc.) so that each node in an independent group is either not connected to another node (e.g., unconnected node 530) or the node 535 is connected by an edge 515*b* to a node 540 in the other independent group.

Figure 7:
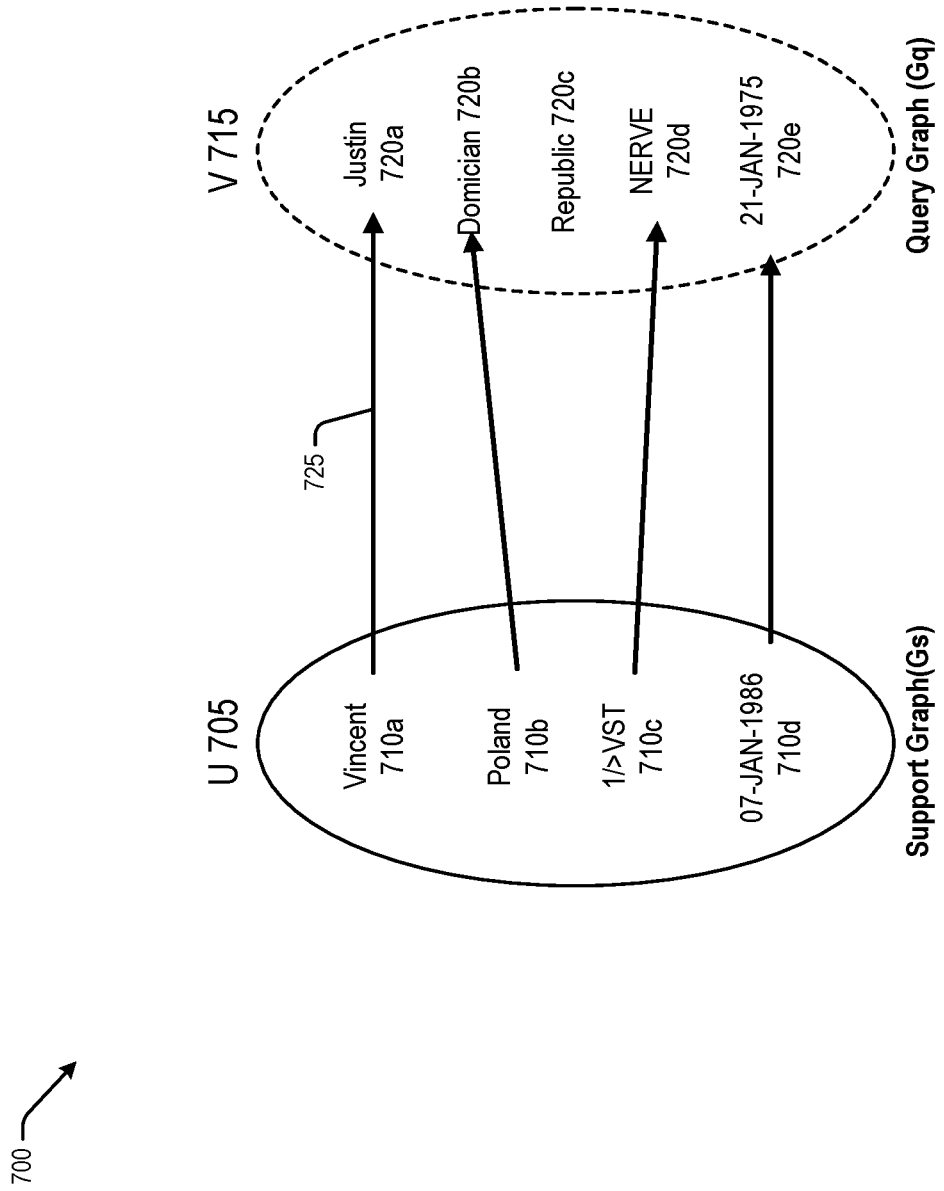
FIG. 7 shows a diagram showing a matching graph created from two visually rich documents according to an embodiment.

FIG. 7 shows a diagram showing a matching graph 700 created from two visually rich documents according to an embodiment. Bipartite matching can be used to assign pseudo-labels to visually rich documents (VRDs). Nodes (e.g., 520*a-b*, etc.) can be created for words in a VRD, and the graphs of the two VRDs can be treated as a single bipartite graph. A graph matching algorithm can be used to generate a matching graph from the single bipartite graph based at least in part on textual information, visual information, or spatial information.

The first independent group (e.g., U 705) can be created from a labeled VRD (e.g., form-A 305, etc.). The nodes 710a-d in U 705 can contain information about a word from the VRD. The information can include visual information, textual information, or structural information about a word from the VRD. The nodes 710a-d can also include a label for the word associated with the node. The label can be a label that was provided by a human or a pseudo-label created by a model.

The second independent group (e.g., V 715) can be created from an unlabeled VRD (e.g., form-B 320), etc.). The nodes 720a-e can contain information about a word from the VRD including visual information, textual information, or structural information. If a labeled node (e.g., nodes 710a-d) in matching graph 700 is connected to an unlabeled node (e.g., 720a-e) by an edge 725, the label from the labeled node can be assigned to the unlabeled node.

FIG. 8 is a diagram showing a process 800 for using bipartite matching to assign labels to a visually rich document (VRD) according to an embodiment. Instead of creating a bipartite graph from a single graph, two VRDs can be combined to create a bipartite graph. Each graph created from a VRD can be treated as an independent group (e.g., U 505a-b, V 510a-b, U 705, V 715 etc.).

Turning to process 800 in greater detail, at block 805, the graphs can be accessed. The graphs can be accessed by a graph pseudo-labeling module (e.g., graph pseudo-labeling module 1060, etc.) The graphs can include graphs generated from VRDs. The graphs can be generated according to process 400, and the graphs can be accessed from storage (e.g., hard disk drive (HDD), solid state drive (SSD), etc.).

At block 810, a bipartite graph can be created. The accessed graphs can be used to create the bipartite graph, and each accessed graph can be an independent group in the bipartite graph (e.g., U 505a-b, V 510a-b, U 705, V 715, etc.). The bipartite graph can be created by the graph pseudo-labeling module (e.g., graph pseudo-labeling module 1060, etc.). The bipartite graph can be similar to the one disclosed in FIG. 5A. The bipartite graph can be created by connecting nodes from the independent group associated with one VRD to nodes from an independent group associated with a different VRD.

At block 815, a matching graph can be created. A matching module (e.g., matching module 1075, etc.) can determine a matching graph (e.g., matching graph 700, matching graph 510, etc.) from the bipartite graph (e.g., bipartite graph 500, etc.). A matching graph can be a graph where each node is connected to at most one other node. The graph matching module (e.g., matching module 1075, etc.) can create the matching graph by minimizing a cost matrix.

At block 820, labels can be propagated. A label, or pseudo-label, for a first node can be propagated along the matched edge in the matching graph to a second node that is connected to the first node by an edge. The label can be copied by a graph pseudo-labeling module (e.g., graph pseudo-labeling module 1060, etc.) of the labeling module.

Figure 9:
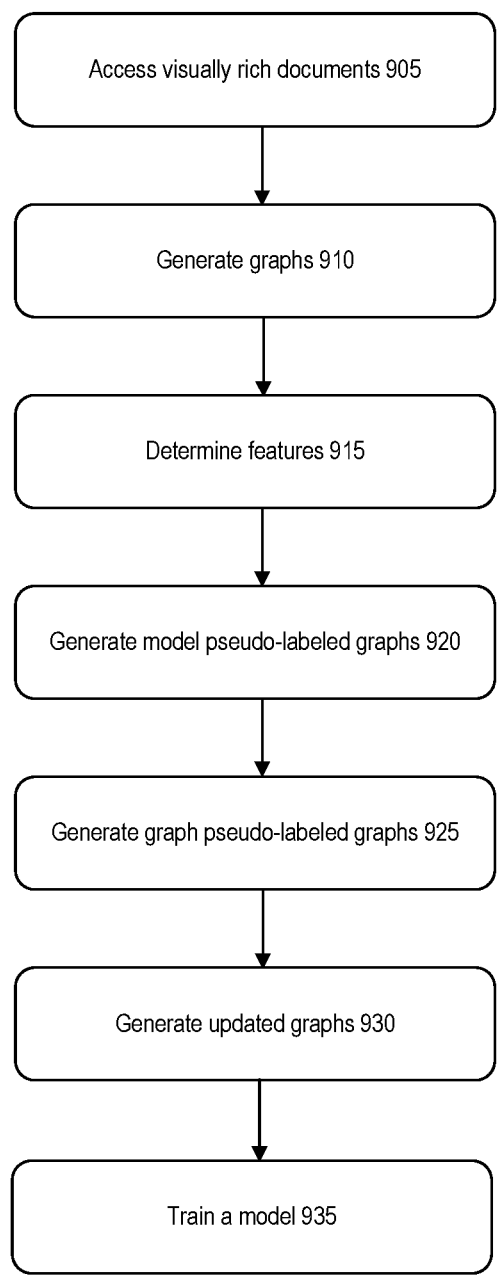
FIG. 9 is a diagram showing a method for training a model to perform key-value extraction according to an embodiment.

FIG. 9 is a diagram showing a method 900 for training a model to perform key-value extraction according to an embodiment. This method is illustrated as a logical flow diagram, each operation of which can be implemented in hardware, computer instructions, or a combination thereof. In the context of computer instructions, the operations may represent computer-executable instructions stored on one or more computer-readable storage media that, when executed by one or more processors, perform the recited operations. Generally, computer-executable instructions include routines, programs, objects, components, data structures and the like that perform particular functions or implement particular data types. The orders in which the operations are described are not intended to be construed as a limitation, and any number of the described operations can be combined in any order and/or in parallel to implement the processes or the method.

Turning to method 900 in greater detail, at block 905, visually rich documents (VRDs) can be accessed. The VRDs can be accessed by a computing device (e.g., pseudo-labeling system 1005 etc.). The VRDs can include an image and a plurality of metadata including at one or more of: labels, pseudo-labels, visual information, structural information, or textual information. The metadata can include one or more words identified in the VRD using optical character recognition (OCR). An OCR module (e.g., OCR module 210, OCR module 1015, etc.) can identify characters in the VRDs.

At block 910, one or more graphs can be generated. The graphs can be generated by a graph construction module (e.g., graph construction module 1035, etc.) based at least in part on the accessed VRDs. Constructing the graphs can include creating a node for at least a subset of the words identified by the OCR module. Any two nodes can be connected by an edge that indicates the Euclidian distance, Manhattan distance, or Chebyshev distance, etc. between the words represented by the nodes. The edge can have a weight that is inversely proportional to the distance between the nodes. The edge can store the width-to-height ratio of text bounding boxes for nodes connected to the edge.

Labeled graphs can be created from VRDs that contain several key-value pairs (e.g., semantic classes, etc.). Edges in the graph can indicate whether the edge is connecting nodes that represent a key-value pair. Nodes in a labeled graph, or pseudo-labeled graph, can be assigned a semantic class. Unlabeled graphs can be created from VRDs that do not contain key-value pairs. Nodes in an unlabeled graph may not be assigned semantic classes.

At block 915, the features can be determined. The features can be determined by a feature extraction module (e.g., feature extraction module 1040, etc.). The features can include at least one of structural information, textual information, or visual information for one or more nodes in the graph. The features can be stored as embeddings, sparse matrices, one-hot encodings, etc. The features extraction module can extract information for one or more nodes in the graph and the extracted information can be fused to create features. Features can be fused via concatenating, weighted summation, weighted averaging, or the extracted data can be stored independently. Features can also be fused by Kronecker product approximated by the block-diagonal tensor decomposition, t-distributed stochastic neighbor embedding (TSNE), principal component analysis (PCA) or any similar techniques.

At block 920, model pseudo-labeled graphs can be generated. The model pseudo-labeled graphs (Gm) can be generated by assigning pseudo-labels to the graphs generated at block 910. The pseudo-labels can be assigned by the model pseudo-labeling module 1080 using a pre-trained model. Pseudo-labels, including key-value pairs or semantic classes, can be assigned to nodes in the graphs by the pre-trained model. The pre-trained model can be a model that was trained to perform key-value extraction. The pre-trained model can assign a confidence score and label to nodes where the confidence score can indicate confidence in the label's accuracy. For instance, the a score of 0.0 can indicate low confidence while a score of 1.0 can indicate high confidence.

At block 925, graph labeled graphs can be generated. The graph pseudo-labeled graphs (Gg) can be generated by the graph pseudo-labeling module 1060 in labeling module 1055. A weighted cost matrix based on the extracted features can be computed between nodes in a first graph and nodes in a second graph. The weighted similarity cost can be based at least in part on the features determined at block 915.

When the VRDs accessed at block 905 include at least one labeled VRD and one or more unlabeled VRDs, the labeled document, or pseudo-labeled document, can be used to create a support graph (Gs) with m nodes (e.g., words). Graphs created from unlabeled VRDs can be referred to as query graphs (Gq) with n nodes (e.g., words). A weighted similarity can be computed between each node in Gs against each node in Gq resulting in a cost matrix. The dimensions of the cost matrix can be n×m. The similarity matrix (e.g., cost-matrix) can be computed based at least in part on textual information, structural information, or visual information.

When the VRDs accessed at block 905 are unlabeled VRDs, the VRDs can be used to create Gqs with n nodes. Nodes with consistent features across all Gq can be pseudo-labeled as landmarks (e.g., static field, etc.). A static word with similar neighboring words across all Gq can be labeled as a landmark. Nodes that are not landmarks can be pseudo-labeled as fields (e.g., dynamic fields, etc.). For instance, in an intake form at a medical practice, a landmark can be a question asking for any allergies and a field can be a patient's response that lists allergens.

Without a labeled VRD, graphs from the Gq can be selected as a Gs. At least one of the following graphs can be selected as Gs: a graph with the maximum number of nodes (e.g., Gq-max), a graph with the minimum number of nodes (e.g., Gq-min), or a graph with the average number of nodes (Gq-mean). A cost matrix can be computed between one or more of the selected Gs graphs and one or more of the Gq graphs. One or more cost matrices can be calculated for a Gq.

A matching graph can be calculated between a Gs and a Gq where the Gs is one independent group (e.g., U 505*a-b*, U 705, etc.) and the Gq is a different independent group (e.g., V 510*a-b*, V 715, etc.). Edges within the Gs graph or the Gq graph can be removed and edges can be created between Gs nodes and Gq nodes to produce a bipartite graph (e.g., bipartite graph 500, etc.). A matching graph can be determined for the bipartite graph through bipartite matching.

The matching graph can be generated by minimizing the cost matrix. The cost matrix can be minimized by a matching module (e.g., matching module 1075, etc.). The cost matrix can provide a weighted cost for each edge between the two independent groups. The matching problem can be solved as a linear sum assignment problem using the Hungarian matching algorithm (e.g., Mills-Tettey, G. Ayorkor, Anthony Stentz, and M. Bernardine Dias. "The dynamic hungarian algorithm for the assignment problem with changing costs." Robotics Institute, Pittsburgh, PA, Tech. Rep. CMU-RI-TR-07-27 (2007)). The matching problem can be solved by minimizing the overall cost of assignment by finding the best matches between nodes of the two independent groups. Once the matching graph has been determined, a labels, or pseudo-labels, can be duplicated across edges where nodes connected by an edge can share the same label or pseudo-label.

At block 930, updated graphs can be generated. The filtering module 1050 can generate the updated graphs. The updated graphs can be generated by cross referencing the graph labeled graphs (Gg) and the model labeled graphs (Gm) where the cross referenced Gg and the Gm were generated for the same VRD. If a Gg node lacks a label, a label for the corresponding node from the Gm can be assigned to the Gg node. If both the Gg node and its corresponding Gm node have the same label, the label for the Gg node or Gm node may not be changed. If a node in a Gg has a different label than its corresponding Gm node, the Gg node label may be changed, left the same, or updated to the Gm node label based at least in part on the label's confidence score. Whether to change the Gg node's label may be based at least in part on comparing the corresponding Gm node's confidence score to one or more thresholds. Two nodes can be corresponding nodes if they refer to the same word in the same VRD.

At block 935, a model can be trained. The updated graphs can be used to train a machine learning model for key-value extraction. The updated graphs can be enriched using data augmentation techniques like those disclosed in U.S. Non-Provisional Application No. 17,524,157, filed Nov. 11, 2021, entitled "Techniques for Graph Data Structure Augmentation". The machine learning model may finish training when the training loss of the model converges. The machine learning model can be used to re label the graphs to produce new model labeled graphs at block 920. Blocks 920-935 can be repeated until a percentage change in the labels between iterations is below a threshold.

Figure 10:
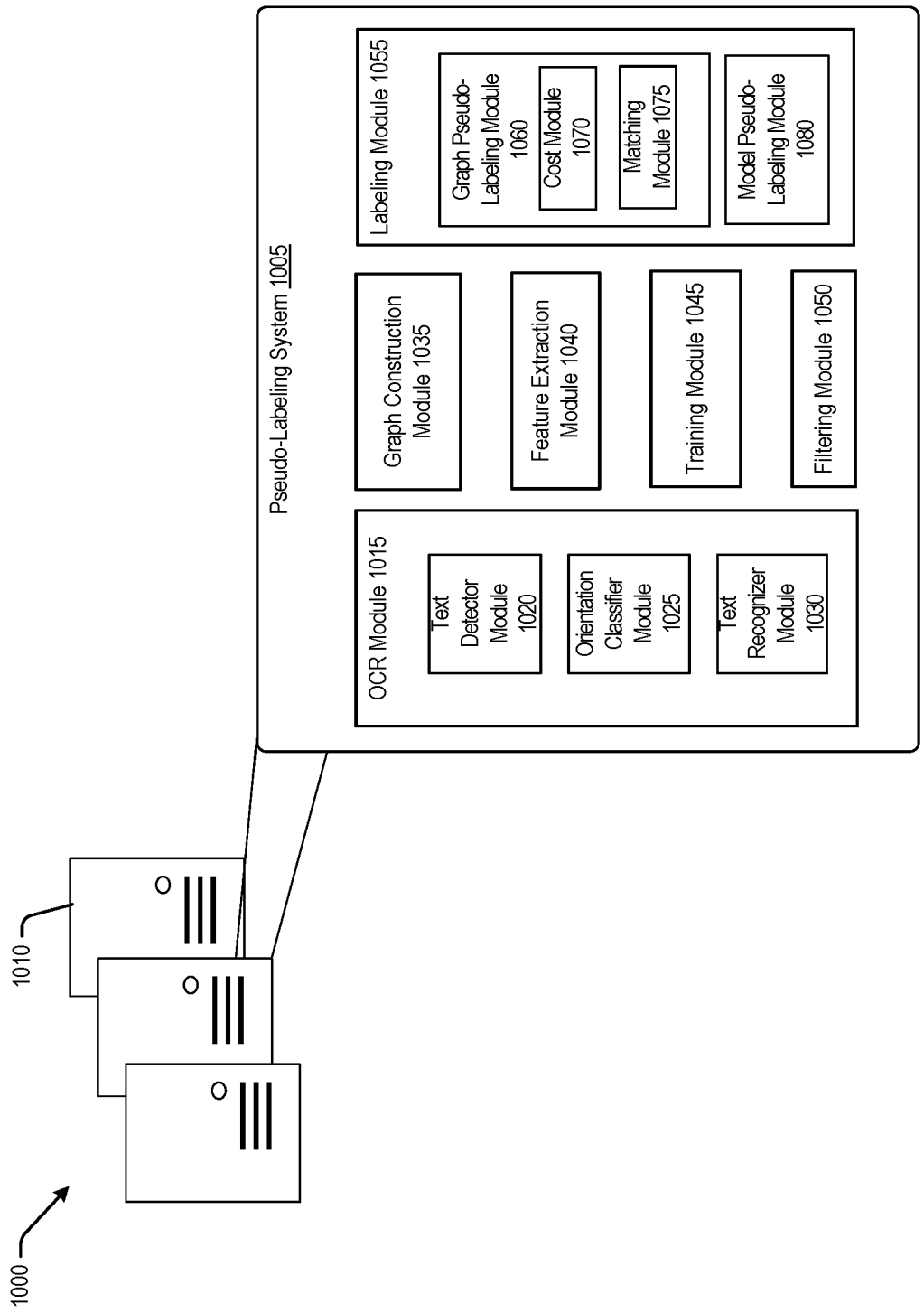
FIG. 10 is a diagram showing a system architecture for a pseudo-labeling system according to an embodiment.

FIG. 10 is a diagram 1000 showing a system architecture for a pseudo-labeling system according to an embodiment. The pseudo-labeling system 1005 can be hosted on computing devices 1010. An optical character recognition (OCR) module 1015 in pseudo-labeling system 1005 can identify characters in a visually rich document (VRD). OCR can be computationally demanding and text detector module 1020 can reduce the amount of OCR processing by segmenting the VRD into areas with characters, where text recognition should be performed, and areas without characters that should be excluded from text recognition. Orientation classifier module 1025 can reduce the amount of OCR that is performed by identifying text's orientation so that text recognition is performed with the correct orientation. Text recognizer module 1030 can recognize and extract text from the VRD.

Graph construction module 1035 can create a graph comprising edges and nodes using output from OCR module 1015. Feature extraction module 1040 can extract features including textual information, visual information, or structural information for a graph including graphs created by graph construction module 1035. Training module 1045 can train an algorithm to produce a machine learning model or training module can fine tune a pre-trained model. Filtering module 1050 can cross reference graph labeled graphs Gg and model labeled graphs Gm to produce updated graphs.

Labeling module 1055 can assign labels to graphs generated by graph construction module 1035. Graph pseudo-labeling module 1060 can assign labels to graphs produced from VRDs using a labeled graph. Cost module 1070 can compute a cost matrix by computing a weighted similarity between each node in Gs against each node in Gq. Matching module 1075 can generate a matching graph from a bipartite graph. Model pseudo-labeling module 1080 can assign pseudo-labels to a graph using a pre-trained machine learning model.

Infrastructure as a service (IaaS) is one particular type of cloud computing. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (e.g., billing, monitoring, logging, security, load balancing and clustering, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud computing model will require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different challenges for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more security group rules provisioned to define how the security of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed must first be set up. In some instances, the provisioning can be done manually, a provisioning tool may be utilized to provision the resources, and/or deployment tools may be utilized to deploy the code once the infrastructure is provisioned.

Figure 11:
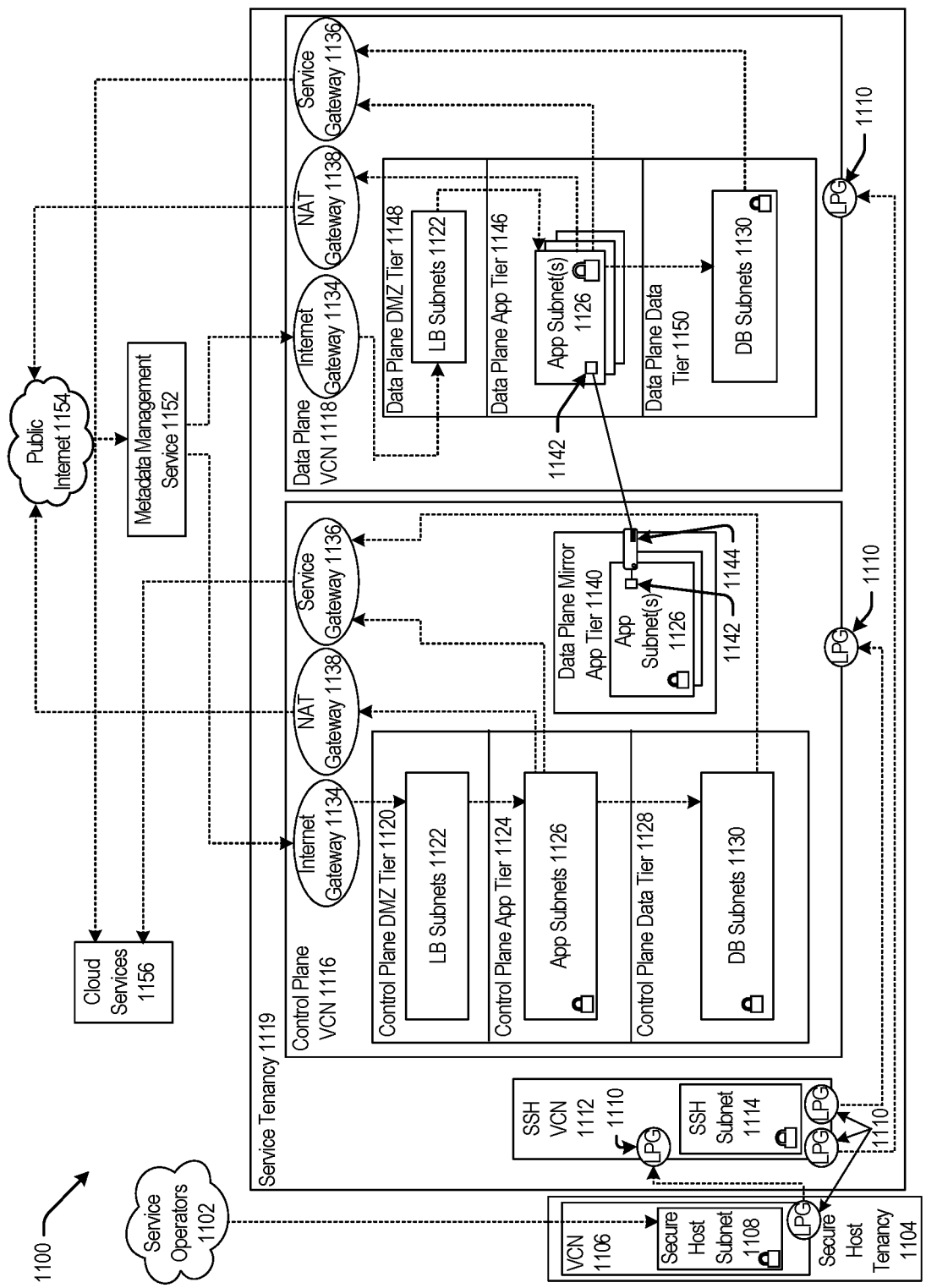
FIG. 11 is a block diagram illustrating one pattern for implementing a cloud infrastructure as a service system, according to at least one embodiment.

FIG. 11 is a block diagram 1100 illustrating an example pattern of an IaaS architecture, according to at least one embodiment. Service operators 1102 can be communicatively coupled to a secure host tenancy 1104 that can include a virtual cloud network (VCN) 1106 and a secure host subnet 1108. In some examples, the service operators 1102 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 1106 and/or the Internet.

The VCN 1106 can include a local peering gateway (LPG) 1110 that can be communicatively coupled to a secure shell (SSH) VCN 1112 via an LPG 1110 contained in the SSH VCN 1112. The SSH VCN 1112 can include an SSH subnet 1114, and the SSH VCN 1112 can be communicatively coupled to a control plane VCN 1116 via the LPG 1110 contained in the control plane VCN 1116. Also, the SSH VCN 1112 can be communicatively coupled to a data plane VCN 1118 via an LPG 1110. The control plane VCN 1116 and the data plane VCN 1118 can be contained in a service tenancy 1119 that can be owned and/or operated by the IaaS provider.

The control plane VCN 1116 can include a control plane demilitarized zone (DMZ) tier 1120 that acts as a perimeter network (e.g., portions of a corporate network between the corporate intranet and external networks). The DMZ-based servers may have restricted responsibilities and help keep security breaches contained. Additionally, the DMZ tier 1120 can include one or more load balancer (LB) subnet(s) 1122, a control plane app tier 1124 that can include app subnet(s) 1126, a control plane data tier 1128 that can include database (DB) subnet(s) 1130 (e.g., frontend DB subnet(s) and/or backend DB subnet(s)). The LB subnet(s) 1122 contained in the control plane DMZ tier 1120 can be communicatively coupled to the app subnet(s) 1126 contained in the control plane app tier 1124 and an Internet gateway 1134 that can be contained in the control plane VCN 1116, and the app subnet(s) 1126 can be communicatively coupled to the DB subnet(s) 1130 contained in the control plane data tier 1128 and a service gateway 1136 and a network address translation (NAT) gateway 1138. The control plane VCN 1116 can include the service gateway 1136 and the NAT gateway 1138.

The control plane VCN 1116 can include a data plane mirror app tier 1140 that can include app subnet(s) 1126. The app subnet(s) 1126 contained in the data plane mirror app tier 1140 can include a virtual network interface controller (VNIC) 1142 that can execute a compute instance 1144. The compute instance 1144 can communicatively couple the app subnet(s) 1126 of the data plane mirror app tier 1140 to app subnet(s) 1126 that can be contained in a data plane app tier 1146.

The data plane VCN 1118 can include the data plane app tier 1146, a data plane DMZ tier 1148, and a data plane data tier 1150. The data plane DMZ tier 1148 can include LB subnet(s) 1122 that can be communicatively coupled to the app subnet(s) 1126 of the data plane app tier 1146 and the Internet gateway 1134 of the data plane VCN 1118. The app subnet(s) 1126 can be communicatively coupled to the service gateway 1136 of the data plane VCN 1118 and the NAT gateway 1138 of the data plane VCN 1118. The data plane data tier 1150 can also include the DB subnet(s) 1130 that can be communicatively coupled to the app subnet(s) 1126 of the data plane app tier 1146.

The Internet gateway 1134 of the control plane VCN 1116 and of the data plane VCN 1118 can be communicatively coupled to a metadata management service 1152 that can be communicatively coupled to public Internet 1154. Public Internet 1154 can be communicatively coupled to the NAT gateway 1138 of the control plane VCN 1116 and of the data plane VCN 1118. The service gateway 1136 of the control plane VCN 1116 and of the data plane VCN 1118 can be communicatively couple to cloud services 1156.

In some examples, the service gateway 1136 of the control plane VCN 1116 or of the data plane VCN 1118 can make application programming interface (API) calls to cloud services 1156 without going through public Internet 1154. The API calls to cloud services 1156 from the service gateway 1136 can be one-way: the service gateway 1136 can make API calls to cloud services 1156, and cloud services 1156 can send requested data to the service gateway 1136. But, cloud services 1156 may not initiate API calls to the service gateway 1136.

In some examples, the secure host tenancy 1104 can be directly connected to the service tenancy 1119, which may be otherwise isolated. The secure host subnet 1108 can communicate with the SSH subnet 1114 through an LPG 1110 that may enable two-way communication over an otherwise isolated system. Connecting the secure host subnet 1108 to the SSH subnet 1114 may give the secure host subnet 1108 access to other entities within the service tenancy 1119.

The control plane VCN 1116 may allow users of the service tenancy 1119 to set up or otherwise provision desired resources. Desired resources provisioned in the control plane VCN 1116 may be deployed or otherwise used in the data plane VCN 1118. In some examples, the control plane VCN 1116 can be isolated from the data plane VCN 1118, and the data plane mirror app tier 1140 of the control plane VCN 1116 can communicate with the data plane app tier 1146 of the data plane VCN 1118 via VNICs 1142 that can be contained in the data plane mirror app tier 1140 and the data plane app tier 1146.

In some examples, users of the system, or customers, can make requests, for example create, read, update, or delete (CRUD) operations, through public Internet 1154 that can communicate the requests to the metadata management service 1152. The metadata management service 1152 can communicate the request to the control plane VCN 1116 through the Internet gateway 1134. The request can be received by the LB subnet(s) 1122 contained in the control plane DMZ tier 1120. The LB subnet(s) 1122 may determine that the request is valid, and in response to this determination, the LB subnet(s) 1122 can transmit the request to app subnet(s) 1126 contained in the control plane app tier 1124. If the request is validated and requires a call to public Internet 1154, the call to public Internet 1154 may be transmitted to the NAT gateway 1138 that can make the call to public Internet 1154. Memory that may be desired to be stored by the request can be stored in the DB subnet(s) 1130.

In some examples, the data plane mirror app tier 1140 can facilitate direct communication between the control plane VCN 1116 and the data plane VCN 1118. For example, changes, updates, or other suitable modifications to configuration may be desired to be applied to the resources contained in the data plane VCN 1118. Via a VNIC 1142, the control plane VCN 1116 can directly communicate with, and can thereby execute the changes, updates, or other suitable modifications to configuration to, resources contained in the data plane VCN 1118.

In some embodiments, the control plane VCN 1116 and the data plane VCN 1118 can be contained in the service tenancy 1119. In this case, the user, or the customer, of the system may not own or operate either the control plane VCN 1116 or the data plane VCN 1118. Instead, the IaaS provider may own or operate the control plane VCN 1116 and the data plane VCN 1118, both of which may be contained in the service tenancy 1119. This embodiment can enable isolation of networks that may prevent users or customers from interacting with other users', or other customers', resources. Also, this embodiment may allow users or customers of the system to store databases privately without needing to rely on public Internet 1154, which may not have a desired level of security, for storage.

In other embodiments, the LB subnet(s) 1122 contained in the control plane VCN 1116 can be configured to receive a signal from the service gateway 1136. In this embodiment, the control plane VCN 1116 and the data plane VCN 1118 may be configured to be called by a customer of the IaaS provider without calling public Internet 1154. Customers of the IaaS provider may desire this embodiment since database(s) that the customers use may be controlled by the IaaS provider and may be stored on the service tenancy 1119, which may be isolated from public Internet 1154.

Figure 12:
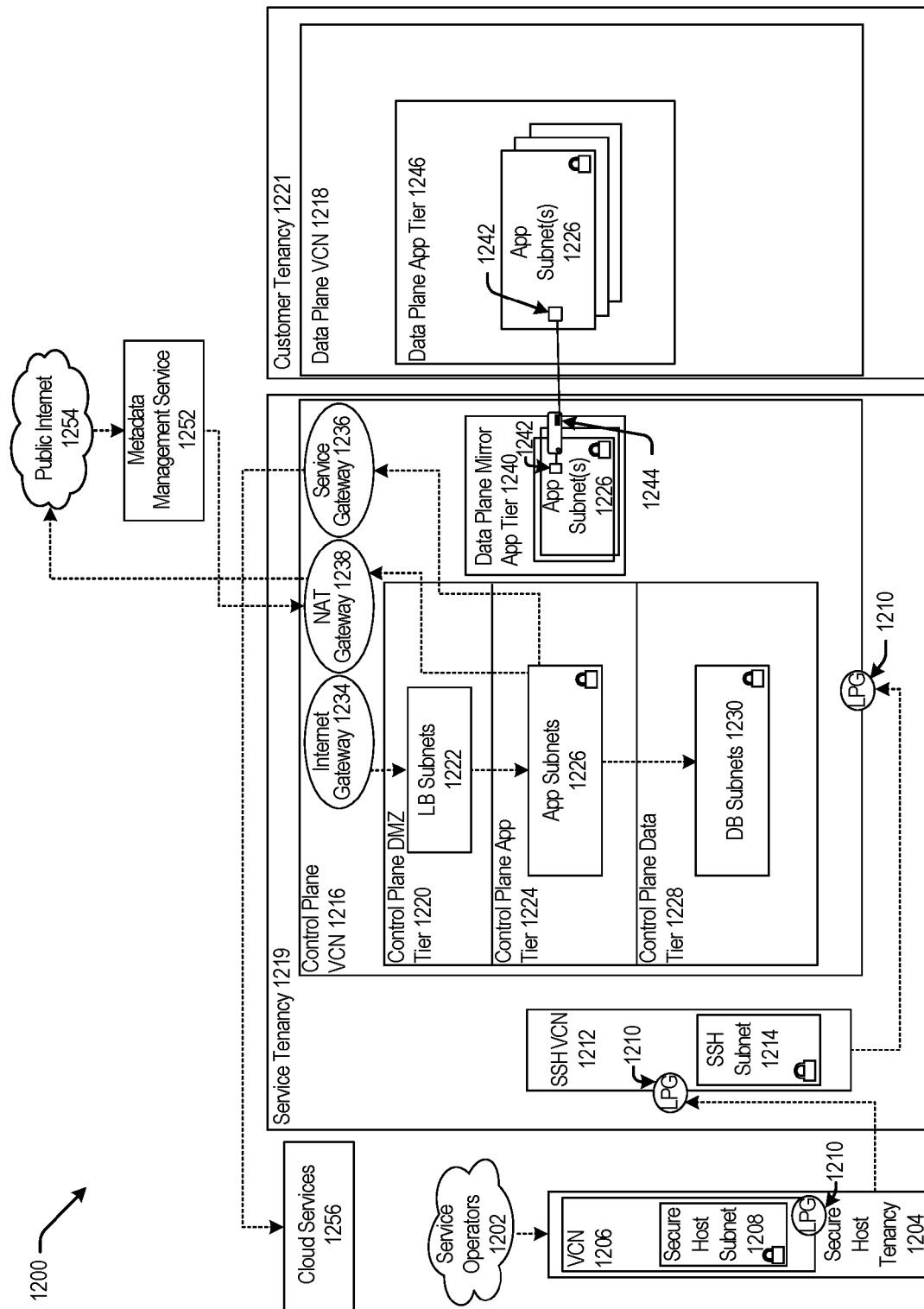
FIG. 12 is a block diagram illustrating another pattern for implementing a cloud infrastructure as a service system, according to at least one embodiment.

FIG. 12 is a block diagram 1200 illustrating another example pattern of an IaaS architecture, according to at least one embodiment. Service operators 1202 (e.g. service operators 1102 of FIG. 11) can be communicatively coupled to a secure host tenancy 1204 (e.g. the secure host tenancy 1104 of FIG. 11) that can include a virtual cloud network (VCN) 1206 (e.g. the VCN 1106 of FIG. 11) and a secure host subnet 1208 (e.g. the secure host subnet 1108 of FIG. 11). The VCN 1206 can include a local peering gateway (LPG) 1210 (e.g. the LPG 1110 of FIG. 11) that can be communicatively coupled to a secure shell (SSH) VCN 1212 (e.g. the SSH VCN 1112 of FIG. 11) via an LPG 1110 contained in the SSH VCN 1212. The SSH VCN 1212 can include an SSH subnet 1214 (e.g. the SSH subnet 1114 of FIG. 11), and the SSH VCN 1212 can be communicatively coupled to a control plane VCN 1216 (e.g. the control plane VCN 1116 of FIG. 11) via an LPG 1210 contained in the control plane VCN 1216. The control plane VCN 1216 can be contained in a service tenancy 1219 (e.g. the service tenancy 1119 of FIG. 11), and the data plane VCN 1218 (e.g. the data plane VCN 1118 of FIG. 11) can be contained in a customer tenancy 1221 that may be owned or operated by users, or customers, of the system.

The control plane VCN 1216 can include a control plane DMZ tier 1220 (e.g. the control plane DMZ tier 1120 of FIG. 11) that can include LB subnet(s) 1222 (e.g. LB subnet(s) 1122 of FIG. 11), a control plane app tier 1224 (e.g. the control plane app tier 1124 of FIG. 11) that can include app subnet(s) 1226 (e.g. app subnet(s) 1126 of FIG. 11), a control plane data tier 1228 (e.g. the control plane data tier 1128 of FIG. 11) that can include database (DB) subnet(s) 1230 (e.g. similar to DB subnet(s) 1130 of FIG. 11). The LB subnet(s) 1222 contained in the control plane DMZ tier 1220 can be communicatively coupled to the app subnet(s) 1226 contained in the control plane app tier 1224 and an Internet gateway 1234 (e.g. the Internet gateway 1134 of FIG. 11) that can be contained in the control plane VCN 1216, and the app subnet(s) 1226 can be communicatively coupled to the DB subnet(s) 1230 contained in the control plane data tier 1228 and a service gateway 1236 (e.g. the service gateway of FIG. 11) and a network address translation (NAT) gateway 1238 (e.g. the NAT gateway 1138 of FIG. 11). The control plane VCN 1216 can include the service gateway 1236 and the NAT gateway 1238.

The control plane VCN 1216 can include a data plane mirror app tier 1240 (e.g. the data plane mirror app tier 1140 of FIG. 11) that can include app subnet(s) 1226. The app subnet(s) 1226 contained in the data plane mirror app tier 1240 can include a virtual network interface controller (VNIC) 1242 (e.g. the VNIC of 1142) that can execute a compute instance 1244 (e.g. similar to the compute instance 1144 of FIG. 11). The compute instance 1244 can facilitate communication between the app subnet(s) 1226 of the data plane mirror app tier 1240 and the app subnet(s) 1226 that can be contained in a data plane app tier 1246 (e.g. the data plane app tier 1146 of FIG. 11) via the VNIC 1242 contained in the data plane mirror app tier 1240 and the VNIC 1242 contained in the data plane app tier 1246.

The Internet gateway 1234 contained in the control plane VCN 1216 can be communicatively coupled to a metadata management service 1252 (e.g. the metadata management service 1152 of FIG. 11) that can be communicatively coupled to public Internet 1254 (e.g. public Internet 1154 of FIG. 11). Public Internet 1254 can be communicatively coupled to the NAT gateway 1238 contained in the control plane VCN 1216. The service gateway 1236 contained in the control plane VCN 1216 can be communicatively couple to cloud services 1256 (e.g. cloud services 1156 of FIG. 11).

In some examples, the data plane VCN 1218 can be contained in the customer tenancy 1221. In this case, the IaaS provider may provide the control plane VCN 1216 for each customer, and the IaaS provider may, for each customer, set up a unique compute instance 1244 that is contained in the service tenancy 1219. Each compute instance 1244 may allow communication between the control plane VCN 1216, contained in the service tenancy 1219, and the data plane VCN 1218 that is contained in the customer tenancy 1221. The compute instance 1244 may allow resources, that are provisioned in the control plane VCN 1216 that is contained in the service tenancy 1219, to be deployed or otherwise used in the data plane VCN 1218 that is contained in the customer tenancy 1221.

In other examples, the customer of the IaaS provider may have databases that live in the customer tenancy 1221. In this example, the control plane VCN 1216 can include the data plane mirror app tier 1240 that can include app subnet(s) 1226. The data plane mirror app tier 1240 can reside in the data plane VCN 1218, but the data plane mirror app tier 1240 may not live in the data plane VCN 1218. That is, the data plane mirror app tier 1240 may have access to the customer tenancy 1221, but the data plane mirror app tier 1240 may not exist in the data plane VCN 1218 or be owned or operated by the customer of the IaaS provider. The data plane mirror app tier 1240 may be configured to make calls to the data plane VCN 1218 but may not be configured to make calls to any entity contained in the control plane VCN 1216. The customer may desire to deploy or otherwise use resources in the data plane VCN 1218 that are provisioned in the control plane VCN 1216, and the data plane mirror app tier 1240 can facilitate the desired deployment, or other usage of resources, of the customer.

In some embodiments, the customer of the IaaS provider can apply filters to the data plane VCN 1218. In this embodiment, the customer can determine what the data plane VCN 1218 can access, and the customer may restrict access to public Internet 1254 from the data plane VCN 1218. The IaaS provider may not be able to apply filters or otherwise control access of the data plane VCN 1218 to any outside networks or databases. Applying filters and controls by the customer onto the data plane VCN 1218, contained in the customer tenancy 1221, can help isolate the data plane VCN 1218 from other customers and from public Internet 1254.

In some embodiments, cloud services 1256 can be called by the service gateway 1236 to access services that may not exist on public Internet 1254, on the control plane VCN 1216, or on the data plane VCN 1218. The connection between cloud services 1256 and the control plane VCN 1216 or the data plane VCN 1218 may not be live or continuous. Cloud services 1256 may exist on a different network owned or operated by the IaaS provider. Cloud services 1256 may be configured to receive calls from the service gateway 1236 and may be configured to not receive calls from public Internet 1254. Some cloud services 1256 may be isolated from other cloud services 1256, and the control plane VCN 1216 may be isolated from cloud services 1256 that may not be in the same region as the control plane VCN 1216. For example, the control plane VCN 1216 may be located in "Region 1," and cloud service "Deployment 11," may be located in Region 1 and in "Region 2." If a call to Deployment 11 is made by the service gateway 1236 contained in the control plane VCN 1216 located in Region 1, the call may be transmitted to Deployment 11 in Region 1. In this example, the control plane VCN 1216, or Deployment 11 in Region 1, may not be communicatively coupled to, or otherwise in communication with, Deployment 11 in Region 2.

Figure 13:
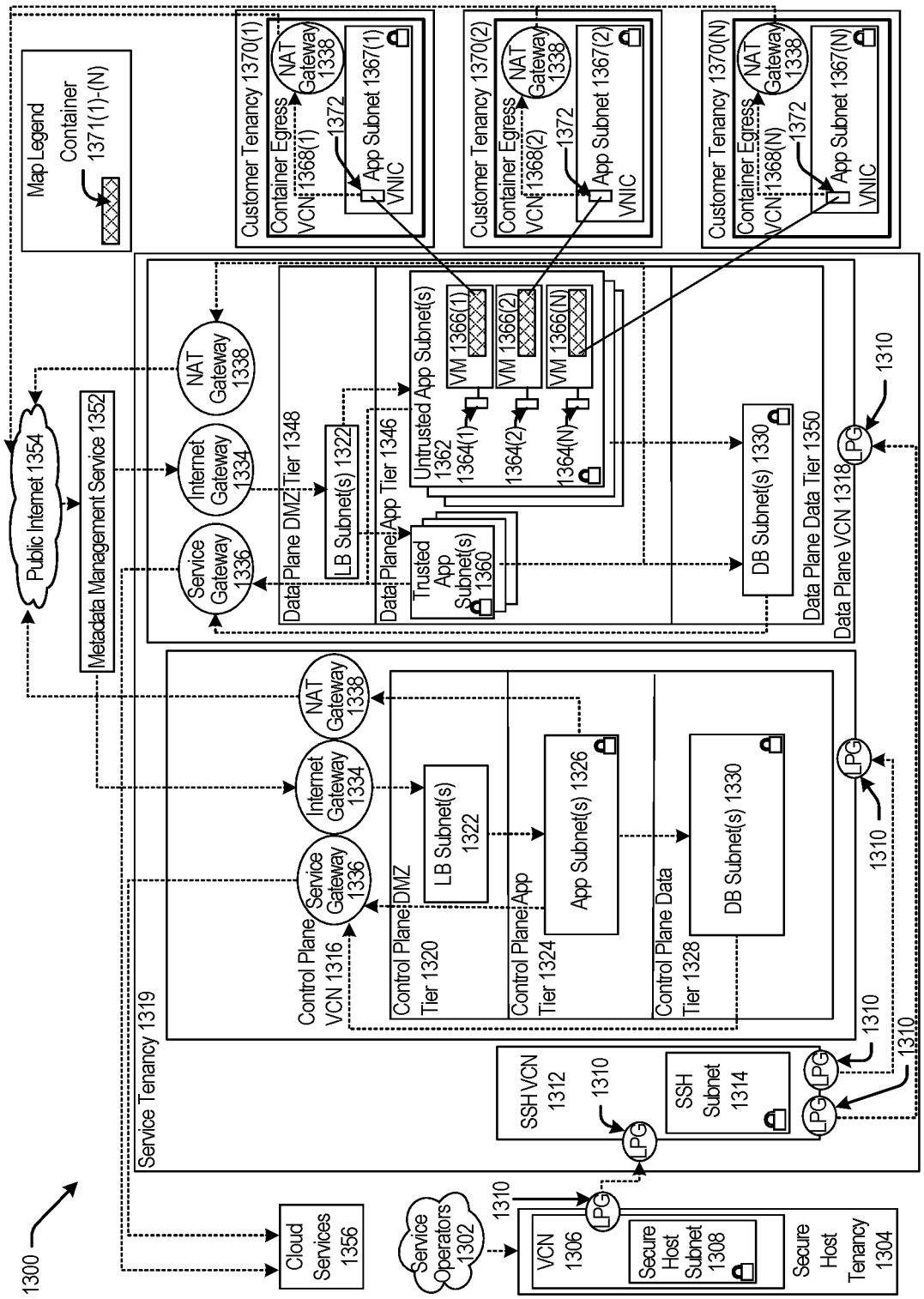
FIG. 13 is a block diagram illustrating another pattern for implementing a cloud infrastructure as a service system, according to at least one embodiment.

FIG. 13 is a block diagram 1300 illustrating another example pattern of an IaaS architecture, according to at least one embodiment. Service operators 1302 (e.g. service operators 1102 of FIG. 11) can be communicatively coupled to a secure host tenancy 1304 (e.g. the secure host tenancy 1104 of FIG. 11) that can include a virtual cloud network (VCN) 1306 (e.g. the VCN 1106 of FIG. 11) and a secure host subnet 1308 (e.g. the secure host subnet 1108 of FIG. 11). The VCN 1306 can include an LPG 1310 (e.g. the LPG 1110 of FIG. 11) that can be communicatively coupled to an SSH VCN 1312 (e.g. the SSH VCN 1112 of FIG. 11) via an LPG 1310 contained in the SSH VCN 1312. The SSH VCN 1312 can include an SSH subnet 1314 (e.g. the SSH subnet 1114 of FIG. 11), and the SSH VCN 1312 can be communicatively coupled to a control plane VCN 1316 (e.g. the control plane VCN 1116 of FIG. 11) via an LPG 1310 contained in the control plane VCN 1316 and to a data plane VCN 1318 (e.g. the data plane 1118 of FIG. 11) via an LPG 1310 contained in the data plane VCN 1318. The control plane VCN 1316 and the data plane VCN 1318 can be contained in a service tenancy 1319 (e.g. the service tenancy 1119 of FIG. 11).

The control plane VCN 1316 can include a control plane DMZ tier 1320 (e.g. the control plane DMZ tier 1120 of FIG. 11) that can include load balancer (LB) subnet(s) 1322 (e.g. LB subnet(s) 1122 of FIG. 11), a control plane app tier 1324 (e.g. the control plane app tier 1124 of FIG. 11) that can include app subnet(s) 1326 (e.g. similar to app subnet(s) 1126 of FIG. 11), a control plane data tier 1328 (e.g. the control plane data tier 1128 of FIG. 11) that can include DB subnet(s) 1330. The LB subnet(s) 1322 contained in the control plane DMZ tier 1320 can be communicatively coupled to the app subnet(s) 1326 contained in the control plane app tier 1324 and to an Internet gateway 1334 (e.g. the Internet gateway 1134 of FIG. 11) that can be contained in the control plane VCN 1316, and the app subnet(s) 1326 can be communicatively coupled to the DB subnet(s) 1330 contained in the control plane data tier 1328 and to a service gateway 1336 (e.g. the service gateway of FIG. 11) and a network address translation (NAT) gateway 1338 (e.g. the NAT gateway 1138 of FIG. 11). The control plane VCN 1316 can include the service gateway 1336 and the NAT gateway 1338.

The data plane VCN 1318 can include a data plane app tier 1346 (e.g. the data plane app tier 1146 of FIG. 11), a data plane DMZ tier 1348 (e.g. the data plane DMZ tier 1148 of FIG. 11), and a data plane data tier 1350 (e.g. the data plane data tier 1150 of FIG. 11). The data plane DMZ tier 1348 can include LB subnet(s) 1322 that can be communicatively coupled to trusted app subnet(s) 1360 and untrusted app subnet(s) 1362 of the data plane app tier 1346 and the Internet gateway 1334 contained in the data plane VCN 1318. The trusted app subnet(s) 1360 can be communicatively coupled to the service gateway 1336 contained in the data plane VCN 1318, the NAT gateway 1338 contained in the data plane VCN 1318, and DB subnet(s) 1330 contained in the data plane data tier 1350. The untrusted app subnet(s) 1362 can be communicatively coupled to the service gateway 1336 contained in the data plane VCN 1318 and DB subnet(s) 1330 contained in the data plane data tier 1350. The data plane data tier 1350 can include DB subnet(s) 1330 that can be communicatively coupled to the service gateway 1336 contained in the data plane VCN 1318.

The untrusted app subnet(s) 1362 can include one or more primary VNICs 1364(1)-(N) that can be communicatively coupled to tenant virtual machines (VMs) 1366(1)-(N). Each tenant VM 1366(1)-(N) can be communicatively coupled to a respective app subnet 1367(1)-(N) that can be contained in respective container egress VCNs 1368(1)-(N) that can be contained in respective customer tenancies 1370(1)-(N). Respective secondary VNICs 1372(1)-(N) can facilitate communication between the untrusted app subnet(s) 1362 contained in the data plane VCN 1318 and the app subnet contained in the container egress VCNs 1368(1)-(N). Each container egress VCNs 1368(1)-(N) can include a NAT gateway 1338 that can be communicatively coupled to public Internet 1354 (e.g. public Internet 1154 of FIG. 11).

The Internet gateway 1334 contained in the control plane VCN 1316 and contained in the data plane VCN 1318 can be communicatively coupled to a metadata management service 1352 (e.g. the metadata management system 1152 of FIG. 11) that can be communicatively coupled to public Internet 1354. Public Internet 1354 can be communicatively coupled to the NAT gateway 1338 contained in the control plane VCN 1316 and contained in the data plane VCN 1318. The service gateway 1336 contained in the control plane VCN 1316 and contained in the data plane VCN 1318 can be communicatively couple to cloud services 1356.

In some embodiments, the data plane VCN 1318 can be integrated with customer tenancies 1370. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane tier app 1346. Code to run the function may be executed in the VMs 1366(1)-(N), and the code may not be configured to run anywhere else on the data plane VCN 1318. Each VM 1366(1)-(N) may be connected to one customer tenancy 1370. Respective containers 1371(1)-(N) contained in the VMs 1366(1)-(N) may be configured to run the code. In this case, there can be a dual isolation (e.g., the containers 1371(1)-(N) running code, where the containers 1371(1)-(N) may be contained in at least the VM 1366(1)-(N) that are contained in the untrusted app subnet(s) 1362), which may help prevent incorrect or otherwise undesirable code from damaging the network of the IaaS provider or from damaging a network of a different customer. The containers 1371(1)-(N) may be communicatively coupled to the customer tenancy 1370 and may be configured to transmit or receive data from the customer tenancy 1370. The containers 1371(1)-(N) may not be configured to transmit or receive data from any other entity in the data plane VCN 1318. Upon completion of running the code, the IaaS provider may kill or otherwise dispose of the containers 1371(1)-(N).

In some embodiments, the trusted app subnet(s) 1360 may run code that may be owned or operated by the IaaS provider. In this embodiment, the trusted app subnet(s) 1360 may be communicatively coupled to the DB subnet(s) 1330 and be configured to execute CRUD operations in the DB subnet(s) 1330. The untrusted app subnet(s) 1362 may be communicatively coupled to the DB subnet(s) 1330, but in this embodiment, the untrusted app subnet(s) may be configured to execute read operations in the DB subnet(s) 1330. The containers 1371(1)-(N) that can be contained in the VM 1366(1)-(N) of each customer and that may run code from the customer may not be communicatively coupled with the DB subnet(s) 1330.

In other embodiments, the control plane VCN 1316 and the data plane VCN 1318 may not be directly communicatively coupled. In this embodiment, there may be no direct communication between the control plane VCN 1316 and the data plane VCN 1318. However, communication can occur indirectly through at least one method. An LPG 1310 may be established by the IaaS provider that can facilitate communication between the control plane VCN 1316 and the data plane VCN 1318. In another example, the control plane VCN 1316 or the data plane VCN 1318 can make a call to cloud services 1356 via the service gateway 1336. For example, a call to cloud services 1356 from the control plane VCN 1316 can include a request for a service that can communicate with the data plane VCN 1318.

Figure 14:
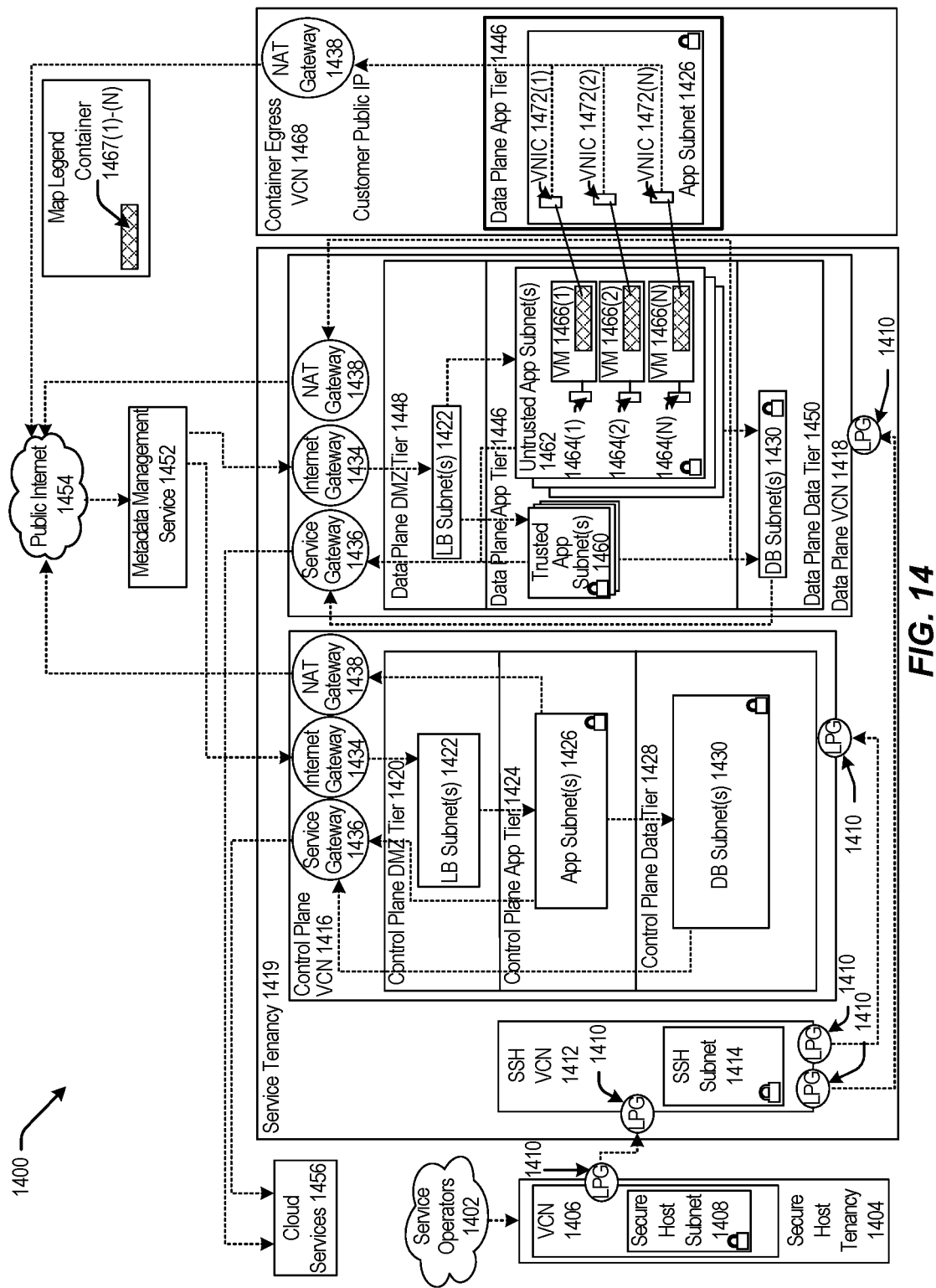
FIG. 14 is a block diagram illustrating another pattern for implementing a cloud infrastructure as a service system, according to at least one embodiment.

FIG. 14 is a block diagram 1400 illustrating another example pattern of an IaaS architecture, according to at least one embodiment. Service operators 1402 (e.g. service operators 1102 of FIG. 11) can be communicatively coupled to a secure host tenancy 1404 (e.g. the secure host tenancy 1104 of FIG. 11) that can include a virtual cloud network (VCN) 1406 (e.g. the VCN 1106 of FIG. 11) and a secure host subnet 1408 (e.g. the secure host subnet 1108 of FIG. 11). The VCN 1406 can include an LPG 1410 (e.g. the LPG 1110 of FIG. 11) that can be communicatively coupled to an SSH VCN 1412 (e.g. the SSH VCN 1112 of FIG. 11) via an LPG 1410 contained in the SSH VCN 1412. The SSH VCN 1412 can include an SSH subnet 1414 (e.g. the SSH subnet 1114 of FIG. 11), and the SSH VCN 1412 can be communicatively coupled to a control plane VCN 1416 (e.g. the control plane VCN 1116 of FIG. 11) via an LPG 1410 contained in the control plane VCN 1416 and to a data plane VCN 1418 (e.g. the data plane 1118 of FIG. 11) via an LPG 1410 contained in the data plane VCN 1418. The control plane VCN 1416 and the data plane VCN 1418 can be contained in a service tenancy 1419 (e.g. the service tenancy 1119 of FIG. 11).

The control plane VCN 1416 can include a control plane DMZ tier 1420 (e.g. the control plane DMZ tier 1120 of FIG. 11) that can include LB subnet(s) 1422 (e.g. LB subnet(s) 1122 of FIG. 11), a control plane app tier 1424 (e.g. the control plane app tier 1124 of FIG. 11) that can include app subnet(s) 1426 (e.g. app subnet(s) 1126 of FIG. 11), a control plane data tier 1428 (e.g. the control plane data tier 1128 of FIG. 11) that can include DB subnet(s) 1430 (e.g. DB subnet(s) 1330 of FIG. 13). The LB subnet(s) 1422 contained in the control plane DMZ tier 1420 can be communicatively coupled to the app subnet(s) 1426 contained in the control plane app tier 1424 and to an Internet gateway 1434 (e.g. the Internet gateway 1134 of FIG. 11) that can be contained in the control plane VCN 1416, and the app subnet(s) 1426 can be communicatively coupled to the DB subnet(s) 1430 contained in the control plane data tier 1428 and to a service gateway 1436 (e.g. the service gateway of FIG. 11) and a network address translation (NAT) gateway 1438 (e.g. the NAT gateway 1138 of FIG. 11). The control plane VCN 1416 can include the service gateway 1436 and the NAT gateway 1438.

The data plane VCN 1418 can include a data plane app tier 1446 (e.g. the data plane app tier 1146 of FIG. 11), a data plane DMZ tier 1448 (e.g. the data plane DMZ tier 1148 of FIG. 11), and a data plane data tier 1450 (e.g. the data plane data tier 1150 of FIG. 11). The data plane DMZ tier 1448 can include LB subnet(s) 1422 that can be communicatively coupled to trusted app subnet(s) 1460 (e.g. trusted app subnet(s) 1360 of FIG. 13) and untrusted app subnet(s) 1462 (e.g. untrusted app subnet(s) 1362 of FIG. 13) of the data plane app tier 1446 and the Internet gateway 1434 contained in the data plane VCN 1418. The trusted app subnet(s) 1460 can be communicatively coupled to the service gateway 1436 contained in the data plane VCN 1418, the NAT gateway 1438 contained in the data plane VCN 1418, and DB subnet(s) 1430 contained in the data plane data tier 1450. The untrusted app subnet(s) 1462 can be communicatively coupled to the service gateway 1436 contained in the data plane VCN 1418 and DB subnet(s) 1430 contained in the data plane data tier 1450. The data plane data tier 1450 can include DB subnet(s) 1430 that can be communicatively coupled to the service gateway 1436 contained in the data plane VCN 1418.

The untrusted app subnet(s) 1462 can include primary VNICs 1464(1)-(N) that can be communicatively coupled to tenant virtual machines (VMs) 1466(1)-(N) residing within the untrusted app subnet(s) 1462. Each tenant VM 1466(1)-(N) can run code in a respective container 1467(1)-(N), and be communicatively coupled to an app subnet 1426 that can be contained in a data plane app tier 1446 that can be contained in a container egress VCN 1468. Respective secondary VNICs 1472(1)-(N) can facilitate communication between the untrusted app subnet(s) 1462 contained in the data plane VCN 1418 and the app subnet contained in the container egress VCN 1468. The container egress VCN can include a NAT gateway 1438 that can be communicatively coupled to public Internet 1454 (e.g. public Internet 1154 of FIG. 11).

The Internet gateway 1434 contained in the control plane VCN 1416 and contained in the data plane VCN 1418 can be communicatively coupled to a metadata management service 1452 (e.g. the metadata management system 1152 of FIG. 11) that can be communicatively coupled to public Internet 1454. Public Internet 1454 can be communicatively coupled to the NAT gateway 1438 contained in the control plane VCN 1416 and contained in the data plane VCN 1418. The service gateway 1436 contained in the control plane VCN 1416 and contained in the data plane VCN 1418 can be communicatively couple to cloud services 1456.

In some examples, the pattern illustrated by the architecture of block diagram 1400 of FIG. 14 may be considered an exception to the pattern illustrated by the architecture of block diagram 1300 of FIG. 13 and may be desirable for a customer of the IaaS provider if the IaaS provider cannot directly communicate with the customer (e.g., a disconnected region). The respective containers 1467(1)-(N) that are contained in the VMs 1466(1)-(N) for each customer can be accessed in real-time by the customer. The containers 1467(1)-(N) may be configured to make calls to respective secondary VNICs 1472(1)-(N) contained in app subnet(s) 1426 of the data plane app tier 1446 that can be contained in the container egress VCN 1468. The secondary VNICs 1472(1)-(N) can transmit the calls to the NAT gateway 1438 that may transmit the calls to public Internet 1454. In this example, the containers 1467(1)-(N) that can be accessed in real-time by the customer can be isolated from the control plane VCN 1416 and can be isolated from other entities contained in the data plane VCN 1418. The containers 1467(1)-(N) may also be isolated from resources from other customers.

In other examples, the customer can use the containers 1467(1)-(N) to call cloud services 1456. In this example, the customer may run code in the containers 1467(1)-(N) that requests a service from cloud services 1456. The containers 1467(1)-(N) can transmit this request to the secondary VNICs 1472(1)-(N) that can transmit the request to the NAT gateway that can transmit the request to public Internet 1454. Public Internet 1454 can transmit the request to LB subnet(s) 1422 contained in the control plane VCN 1416 via the Internet gateway 1434. In response to determining the request is valid, the LB subnet(s) can transmit the request to app subnet(s) 1426 that can transmit the request to cloud services 1456 via the service gateway 1436.

It should be appreciated that IaaS architectures 1100, 1200, 1300, 1400 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

Figure 15:
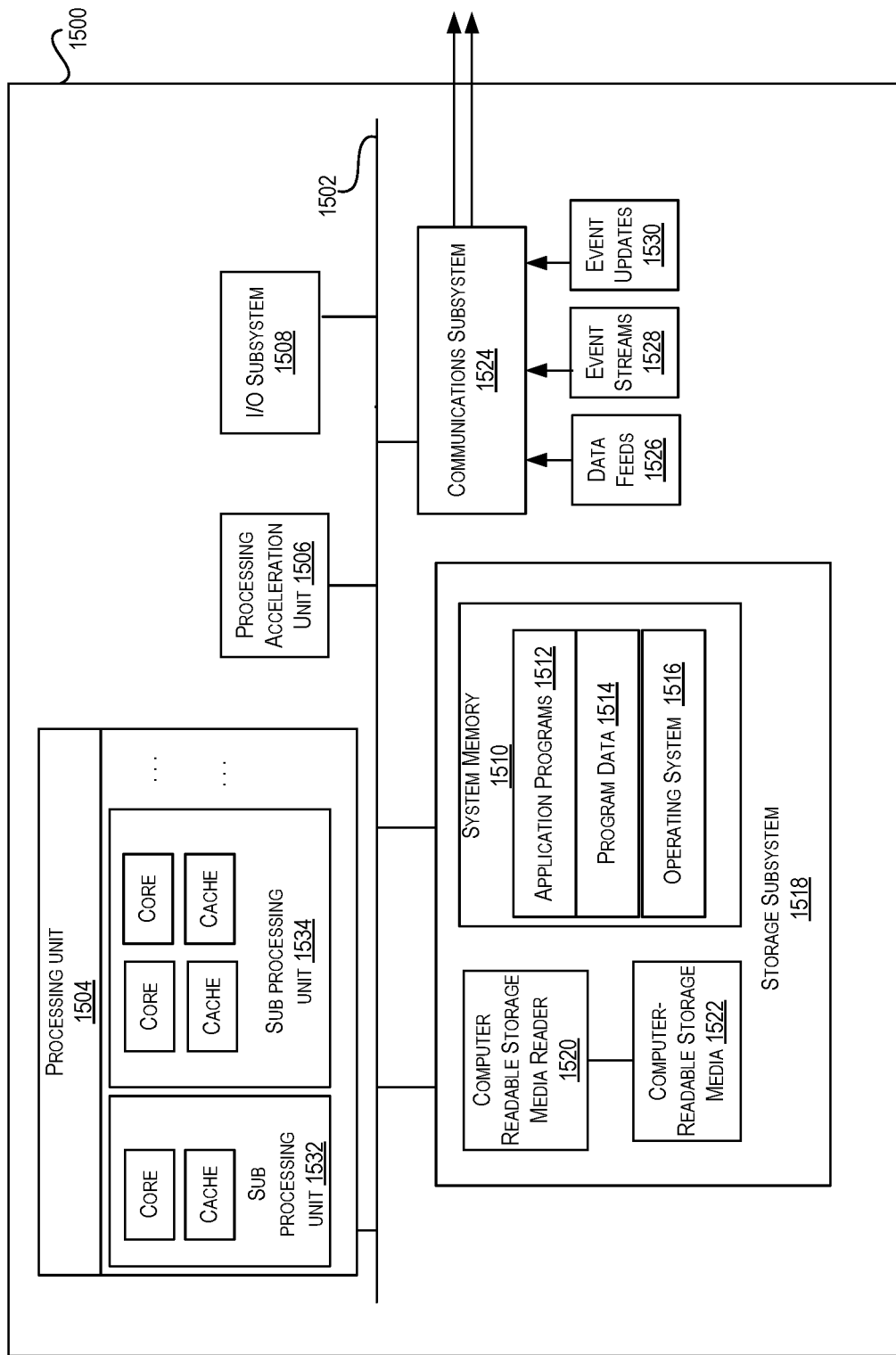
FIG. 15 is a block diagram illustrating an example computer system, according to at least one embodiment.

FIG. 15 illustrates an example computer system 1500, in which various embodiments may be implemented. The system 1500 may be used to implement any of the computer systems described above. As shown in the figure, computer system 1500 includes a processing unit 1504 that communicates with a number of peripheral subsystems via a bus subsystem 1502. These peripheral subsystems may include a processing acceleration unit 1506, an I/O subsystem 1508, a storage subsystem 1518 and a communications subsystem 1524. Storage subsystem 1518 includes tangible computer-readable storage media 1522 and a system memory 1510.

Bus subsystem 1502 provides a mechanism for letting the various components and subsystems of computer system 1500 communicate with each other as intended. Although bus subsystem 1502 is shown schematically as a single bus, alternative embodiments of the bus subsystem may utilize multiple buses. Bus subsystem 1502 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1504, which can be implemented as one or more integrated circuits (e.g., a conventional microprocessor or microcontroller), controls the operation of computer system 1500. One or more processors may be included in processing unit 1504. These processors may include single core or multicore processors. In certain embodiments, processing unit 1504 may be implemented as one or more independent processing units 1532 and/or 1534 with single or multicore processors included in each processing unit. In other embodiments, processing unit 1504 may also be implemented as a quad-core processing unit formed by integrating two dual-core processors into a single chip.

In various embodiments, processing unit 1504 can execute a variety of programs in response to program code and can maintain multiple concurrently executing programs or processes. At any given time, some or all of the program code to be executed can be resident in processor(s) 1504 and/or in storage subsystem 1518. Through suitable programming, processor(s) 1504 can provide various functionalities described above. Computer system 1500 may additionally include a processing acceleration unit 1506, which can include a digital signal processor (DSP), a special-purpose processor, and/or the like.

I/O subsystem 1508 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1500 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1500 may comprise a storage subsystem 1518 that comprises software elements, shown as being currently located within a system memory 1510. System memory 1510 may store program instructions that are loadable and executable on processing unit 1504, as well as data generated during the execution of these programs.

Depending on the configuration and type of computer system 1500, system memory 1510 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 1504. In some implementations, system memory 1510 may include multiple different types of memory, such as static random access memory (SRAM) or dynamic random access memory (DRAM). In some implementations, a basic input/output system (BIOS), containing the basic routines that help to transfer information between elements within computer system 1500, such as during start-up, may typically be stored in the ROM. By way of example, and not limitation, system memory 1510 also illustrates application programs 1512, which may include client applications, Web browsers, mid-tier applications, relational database management systems (RDBMS), etc., program data 1514, and an operating system 1516. By way of example, operating system 1516 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 15 OS, and Palm® OS operating systems.

Storage subsystem 1518 may also provide a tangible computer-readable storage medium for storing the basic programming and data constructs that provide the functionality of some embodiments. Software (programs, code modules, instructions) that when executed by a processor provide the functionality described above may be stored in storage subsystem 1518. These software modules or instructions may be executed by processing unit 1504. Storage subsystem 1518 may also provide a repository for storing data used in accordance with the present disclosure.

Storage subsystem 1500 may also include a computer-readable storage media reader 1520 that can further be connected to computer-readable storage media 1522. Together and, optionally, in combination with system memory 1510, computer-readable storage media 1522 may comprehensively represent remote, local, fixed, and/or removable storage devices plus storage media for temporarily and/or more permanently containing, storing, transmitting, and retrieving computer-readable information.

Computer-readable storage media 1522 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 1500.

By way of example, computer-readable storage media 1522 may include a hard disk drive that reads from or writes to non-removable, nonvolatile magnetic media, a magnetic disk drive that reads from or writes to a removable, nonvolatile magnetic disk, and an optical disk drive that reads from or writes to a removable, nonvolatile optical disk such as a CD ROM, DVD, and Blu-Ray® disk, or other optical media. Computer-readable storage media 1522 may include, but is not limited to, Zip® drives, flash memory cards, universal serial bus (USB) flash drives, secure digital (SD) cards, DVD disks, digital video tape, and the like. Computer-readable storage media 1522 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1500.

Communications subsystem 1524 provides an interface to other computer systems and networks. Communications subsystem 1524 serves as an interface for receiving data from and transmitting data to other systems from computer system 1500. For example, communications subsystem 1524 may enable computer system 1500 to connect to one or more devices via the Internet. In some embodiments communications subsystem 1524 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1524 can provide wired network connectivity (e.g., Ethernet) in addition to or instead of a wireless interface.

In some embodiments, communications subsystem 1524 may also receive input communication in the form of structured and/or unstructured data feeds 1526, event streams 1528, event updates 1530, and the like on behalf of one or more users who may use computer system 1500.

By way of example, communications subsystem 1524 may be configured to receive data feeds 1526 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1524 may also be configured to receive data in the form of continuous data streams, which may include event streams 1528 of real-time events and/or event updates 1530, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1524 may also be configured to output the structured and/or unstructured data feeds 1526, event streams 1528, event updates 1530, and the like to one or more databases that may be in communication with one or more streaming data source computers coupled to computer system 1500.

Computer system 1500 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1500 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Although specific embodiments have been described, various modifications, alterations, alternative constructions, and equivalents are also encompassed within the scope of the disclosure. Embodiments are not restricted to operation within certain specific data processing environments, but are free to operate within a plurality of data processing environments. Additionally, although embodiments have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments have been described using a particular combination of hardware and software, it should be recognized that other combinations of hardware and software are also within the scope of the present disclosure. Embodiments may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A method, comprising:
   accessing, by a computing device, two or more graphs, each graph being generated from a visually rich document and each graph comprising a plurality of nodes connected by a plurality of edges;
   generating, by a model pseudo-labeling module of the computing device, a plurality of model labeled graphs by assigning a model pseudo-label to at least a subset of the nodes using a pretrained model;
   generating, by a graph pseudo-labeling module of the computing device, a plurality of graph labeled graphs by assigning a graph pseudo-label to at least a subset of the nodes by matching a first node from a first graph to at least a second node from a second graph;

generating, by a filtering module of the computing device, a plurality of updated graphs by updating the nodes based at least in part on cross referencing labels from the model labeled graphs and the graph labeled graphs; and storing, by the computing device, the plurality of updated graphs.

2. The method of claim 1, wherein generating the plurality of updated graphs further comprises:
identifying, by the filtering module of the computing device, a model labeled graph and a graph labeled graph that correspond to the same visually rich document;
identifying, by the filtering module of the computing device, an inconsistent node where the model pseudo-label and the graph pseudo-label do not match; and
updating, by the filtering module of the computing device, an inconsistent label for the inconsistent node based at least in part on a model confidence score for the model pseudo-label or a graph confidence score for the graph pseudo-label.

3. The method of claim 1, wherein at least one graph of the two or more graphs is based at least in part on metadata for the visually rich document, the metadata including at least one of a plurality of words identified with optical character recognition (OCR), a set of user-thresholds, or a plurality of labels.

4. The method of claim 1, wherein at least one graph of the two or more graphs was generated from a labeled visually rich document.

5. The method of claim 1, wherein the visually rich document includes at least one of: a drivers license, a medical bill, a gun license, a passport, a bank card, an employee identification (ID) card, a college identification (ID) card, an invoice, a receipt, a business card, a product catalog, a bank form, an investment form, a credit card statement, an account statement, an insurance form, a real estate form, a hospital form, a registration form, a proof of delivery document, a shipment bill, an inquiry form or a check.

6. The method of claim 1, wherein the plurality of features includes at least one of: structural information, textual information, or visual information.

7. The method of claim 1, wherein the plurality of graph labeled graphs are generated based at least in part on bipartite graph matching.

8. A non-transitory computer-readable medium storing a set of instructions, the set of instructions comprising:
one or more instructions that, when executed by one or more processors of a computing device, cause the computing device to:
access two or more graphs, each graph being generated from a visually rich document and each graph comprising a plurality of nodes connected by a plurality of edges;
generate a plurality of model labeled graphs by assigning a model pseudo-label to at least a subset of the nodes using a pretrained model;
generate a plurality of graph labeled graphs by assigning a graph pseudo-label to at least a subset of the nodes by matching a first node from a first graph to at least a second node from a second graph;
generating a plurality of updated graphs by updating the nodes based at least in part on cross referencing labels from the model labeled graphs and the graph labeled graphs; and
store the plurality of updated graphs.

9. The non-transitory computer-readable medium of claim 8, wherein the one or more instructions, that cause the computing device to generate the plurality of updated graphs, cause the computing device to:
identify a model labeled graph and a graph labeled graph that correspond to the same visually rich document;
identify an inconsistent node where the model pseudo-label and the graph pseudo-label do not match; and
update an inconsistent label for the inconsistent node based at least in part on a model confidence score for the model pseudo-label or a graph confidence score for the graph pseudo-label.

10. The non-transitory computer-readable medium of claim 8, wherein at least one graph of the two or more graphs is based at least in part on metadata for the visually rich document, the metadata including at least one of a plurality of words identified with optical character recognition (OCR), a set of user-thresholds, or a plurality of labels.

11. The non-transitory computer-readable medium of claim 8, wherein at least one graph of the two or more graphs was generated from a labeled visually rich document.

12. The non-transitory computer-readable medium of claim 8, wherein the visually rich document includes at least one of: a drivers license, a medical bill, a gun license, a passport, a bank card, an employee identification (ID) card, a college identification (ID) card, an invoice, a receipt, a business card, a product catalog, a bank form, an investment form, a credit card statement, an account statement, an insurance form, a real estate form, a hospital form, a registration form, a proof of delivery document, a shipment bill, an inquiry form or a check.

13. The non-transitory computer-readable medium of claim 8, wherein the plurality of features includes at least one of: structural information, textual information, or visual information.

14. The non-transitory computer-readable medium of claim 8, wherein the plurality of graph labeled graphs are generated based at least in part on bipartite graph matching.

15. A computing device, comprising:
one or more memories; and
one or more processors, communicatively coupled to the one or more memories, configured to:
access two or more graphs, each graph being generated from a visually rich document and each graph comprising a plurality of nodes connected by a plurality of edges;
generate a plurality of model labeled graphs by assigning a model pseudo-label to at least a subset of the nodes using a pretrained model;
generate a plurality of graph labeled graphs by assigning a graph pseudo-label to at least a subset of the nodes by matching a first node from a first graph to at least a second node from a second graph;
generating a plurality of updated graphs by updating the nodes based at least in part on cross referencing labels from the model labeled graphs and the graph labeled graphs; and
store the plurality of updated graphs.

16. The computing device of claim 15, wherein the one or more processors, when generating the plurality of updated graphs, are configured to:
identify a model labeled graph and a graph labeled graph that correspond to the same visually rich document;
identify an inconsistent node where the model pseudo-label and the graph pseudo-label do not match; and update an inconsistent label for the inconsistent node based at least in part on a model confidence score for the model pseudo-label or a graph confidence score for the graph pseudo-label.

17. The computing device of claim 15, wherein at least one graph of the two or more graphs is based at least in part on metadata for the visually rich document, the metadata including at least one of a plurality of words identified with optical character recognition (OCR), a set of user-thresholds, or a plurality of labels.

18. The computing device of claim 15, wherein at least one graph of the two or more graphs was generated from a labeled visually rich document.

19. The computing device of claim 15, wherein the visually rich document includes at least one of: a drivers license, a medical bill, a gun license, a passport, a bank card, an employee identification (ID) card, a college identification (ID) card, an invoice, a receipt, a business card, a product catalog, a bank form, an investment form, a credit card statement, an account statement, an insurance form, a real estate form, a hospital form, a registration form, a proof of delivery document, a shipment bill, an inquiry form or a check.

20. The computing device of claim 15, wherein the plurality of features includes at least one of: structural information, textual information, or visual information.

* * * * *